(12) United States Patent
Hussmann et al.

(10) Patent No.: US 12,443,701 B2
(45) Date of Patent: Oct. 14, 2025

(54) COMPUTING DEVICE FOR ESTABLISHING A TRUSTED EXECUTION ENVIRONMENT

(71) Applicant: GAPFRUIT AG, Zug (CH)

(72) Inventors: Jan Siddartha Hussmann, Lucerne (CH); Stefan Thöni, Steinhausen (CH); Roman Iten, Unterägeri (CH); Pirmin Duss, Lucerne (CH)

(73) Assignee: GAPFRUIT AG, Zug (CH)

( * ) Notice: Subject to any disclaimer, the term of this patent is extended or adjusted under 35 U.S.C. 154(b) by 199 days.

(21) Appl. No.: 18/005,329

(22) PCT Filed: Jul. 13, 2021

(86) PCT No.: PCT/EP2021/069501
§ 371 (c)(1),
(2) Date: Jan. 12, 2023

(87) PCT Pub. No.: WO2022/013238
PCT Pub. Date: Jan. 20, 2022

(65) Prior Publication Data
US 2023/0281299 A1    Sep. 7, 2023

(30) Foreign Application Priority Data

Jul. 14, 2020 (CH) .......................... 866/20

(51) Int. Cl.
*G06F 21/53* (2013.01)
*G06F 21/31* (2013.01)

(52) U.S. Cl.
CPC .............. *G06F 21/53* (2013.01); *G06F 21/31* (2013.01); *G06F 2221/033* (2013.01)

(58) Field of Classification Search
CPC .... G06F 21/53; G06F 21/31; G06F 2221/033; G06F 21/57
See application file for complete search history.

(56) References Cited

U.S. PATENT DOCUMENTS 10,956,584 B1 * 3/2021 Heaton ................ G06F 9/3802
2013/0096943 A1   4/2013 Carey et al.
(Continued)

OTHER PUBLICATIONS

International Search Report and Written Opinion of the International Searching Authority for International Application No. PCT/EP2021/069501, mailed on Aug. 23, 2021, in 16 pages.

*Primary Examiner* — Anh Nguyen
(74) *Attorney, Agent, or Firm* — Knobbe, Martens, Olson & Bear, LLP

(57) ABSTRACT

The application relates to a computing device configured to establish a trusted execution environment for executing application code. The trusted execution environment comprises an execution engine configured to execute application code; a storage module to provide read-only access to the execution engine for accessing the application code; and a management module. The management module is configured to receive execution request(s); instruct the execution engine to load the application code from the storage module and to execute the application code; bundle data input, response data output to and from the execution engine into input data stream(s) and output data stream(s), respectively; terminate the execution engine after execution of the application code; create an execution record of execution of the application code comprising the input and output data streams; and transmit the execution record to the requestor.

17 Claims, 15 Drawing Sheets

(56) References Cited

U.S. PATENT DOCUMENTS

| | | | |
|---|---|---|---|
| 2013/0151846 A1* | 6/2013 | Baumann | H04L 9/3263 |
| | | | 713/168 |
| 2018/0211054 A1* | 7/2018 | Costa | G06F 21/64 |
| 2019/0065680 A1* | 2/2019 | Carey | G06F 21/6245 |
| 2020/0210585 A1 | 7/2020 | Thom et al. | |
| 2021/0174209 A1* | 6/2021 | Zhuang | G06F 16/2379 |

* cited by examiner

COMPUTING DEVICE FOR ESTABLISHING A TRUSTED EXECUTION ENVIRONMENT

CROSS-REFERENCE TO RELATED APPLICATIONS

This application is the U.S. National Phase under 35 U.S.C. § 371 of International Application PCT/EP2021/069501, filed Jul. 13, 2021, which claims priority to CH Application No. 00866/20, filed Jul. 14, 2020, the entire contents of each of which are incorporated by reference herein and made a part of this specification.

FIELD OF THE INVENTION

The present invention relates to a computing device for establishing a trusted execution environment as well as establishing a trusted execution platform comprising a plurality of trusted execution environments. The present invention further relates to a computer implemented method of operating a trusted execution environment.

BACKGROUND OF THE INVENTION

Today's operating systems are built in a way that the kernel, the most critical part of the system, consists of millions of lines of code. Software that runs on these operating systems can access a vast number of system calls. The kernel provides system calls to user applications to access system resources (sockets, memory, devices etc.). Code, running in kernel mode, has complete access to all of the hardware and can execute any instruction the machine is capable of executing. Important but complex software like device drivers and protocol stacks run in privileged mode. An exploit of a likely error, flaw or fault in any of these components results in the complete takeover of the computing device. Kernels of today's general-purpose operating systems such as Windows, Linux, *BSD or OSX have millions of lines of code (LOC). Linux currently counts 27 M LOC and the Windows kernel is estimated to consist of 65 M LOC. All of which evolved over decades and their main focus was on usability, performance and portability. Additionally, each userland process has access to hundreds of system calls, which poses a huge attack surface to user space applications. Even though Linux is open source, a verification of its correctness is far from feasible due to its enormous complexity.

Writing secure software is a challenging task. Developing products on top of monolithic operating systems, with their large attack surface, require a constant re-evaluation of security issues. Products are often in use long after the vendor has ceased support. Especially in markets such as transportation, telecommunication, banking, industrial/building automation, automotive, critical infrastructure or the military, devices are in use for decades. To ensure the quality of their products over the whole product-life-cycle, manufacturers need to spend a fortune for maintenance, including products sold years ago. Due to the growing complexity, security vulnerabilities are increasing exponentially. For manufacturers it is important that Common Vulnerabilities and Exposures (CVE) from each software component or 3$^{rd}$ party libraries are tracked and responded to by updating their products. Again, because of the complexity of those systems, deploying upgrades often have unforeseen consequences to other parts of the system. Thus, the whole product needs to be rigorously tested before a new system image is sent to the device. It is also very common that even this upgrade mechanism fails, leaving the system in a non-operational state. Maintaining products is therefore very expensive for manufacturers and integrators, resulting in unpatched and unmaintained products open to be exploited and putting the vendor's reputation at risk.

Trusted computing has been introduced to address these issues and to provide a safe environment for executing security-critical/sensitive applications. The term trusted computing herein refers to the general concept of secure computing. At the heart of every trusted system is a minimal Trusted Computing Base (TCB). The kernel is the most trusted part of the operating system. Microkernels are used in areas where vendors are held responsible for the correctness of their products and where physical separation is not feasible. These systems are kept in service for decades and an error may have disastrous consequences. Many areas in IT and OT suffer from cyber threats such as data breaches, DDoS, ransomware etc.; threats, that would significantly be reduced by strong separation.

However, on one hand, developing products with microkernels is extremely difficult and the systems are mostly static and hard to maintain. On the other hand, known products with microkernels are associated with a penalty on the overall performance compared to monolithic kernels.

In order to overcome the disadvantages of known microkernel-based trusted computing technologies, the concept of a trusted execution environment has been developed.

trusted execution environments should provide at least the following:
1. Physically and logically secure the execution of the application code from any interference (Isolation Property).
2. Creating an immutable record of the execution of the application code, detailing input, output, time and device state (Audit Property).
3. Restrict access to start an execution to authorized entities (Authorization Property).

The executed code is provided as an application code and deployed to a storage module of a trusted execution environment. The application code is dynamically loaded with each execution request. The application code can be written in any programming language using any framework provided by the trusted execution environment.

A trusted execution environment operates by receiving requests for execution by an outside system (hereafter referred to as the requestor), processing these requests and sending the response back to the requestor once the execution is finished. A single trusted execution environment device may be able to execute several requests in parallel.

Known trusted execution environments are provided as a secure area of a main processor (e.g. a CPU). Known trusted execution environments are aimed at ensuring that application code and data loaded inside to be protected with respect to confidentiality and integrity. A trusted execution environment as an isolated execution environment provides security features such as isolated execution, integrity of applications executing with the trusted execution environment, along with confidentiality of their assets. In general terms, known trusted execution environments offer an execution space that provides a higher level of security for trusted applications than a commodity operating system (OS). Known trusted execution environment solutions are defined as a "set of hardware and software components providing facilities necessary to support applications".

According to a particular trusted execution environment implementation, a hybrid approach is provided that utilizes both hardware and software to protect data. Only trusted applications running in a trusted execution environment have full access to the device's main processor, peripherals and memory, while hardware isolation protects these from user installed apps running in a main operating system. Software and cryptographic isolation inside the trusted execution environment protect the trusted applications contained within from each other.

In certain known trusted execution environments, in order to provide some level of audit property, each execution is attested by the trusted execution environment by cryptographically signing an execution record. A monotonous counter is used to record the order of executions. Some notion of platform state is used to demonstrate that the trusted execution environment itself is not manipulated or, more generally, in the right overall state.

With respect to the authorization property, according to certain trusted execution environments, requests for execution are cryptographically signed by the requesting entity with a pre-approved key. This is verified by the trusted execution environment before execution is permitted.

A major disadvantage of known hardware-implemented trusted execution environments is a lack of flexibility, updateability and a lack of inside-out isolation.

The lack of flexibility is due to hardware-implemented trusted execution environments providing isolation by means of dedicated, secure area(s) of the hardware resources, in particular by a dedicated area of a central processing unit CPU and of the system memory. Since hardware-implemented trusted execution environments operate under the premise that the operating system is not trusted, a dynamic instantiation of multiple, mutually distrusting trusted execution environments is not possible. In other words, known trusted execution environments are specifically designed either for a particular target application (e.g., crypto libraries, client apps, server apps, embedded apps) or threat models (e.g., remote adversary, side-channel adversary). Although such trusted execution environments mostly satisfy the requirements (workloads) and use-cases they have been designed for, they fail to provide a flexible solution which could dynamically adapt to various use cases.

With respect to the lack of inside-out isolation, known trusted execution environments fail to prevent applications executed by a trusted execution environment from having unrestricted access to resources of the computing environment outside the trusted execution environment. This is due to the fact that existing implementations of trusted execution environments consider applications running in a trusted execution environment as trusted and allow such to have full access to the device's main processor, peripherals and memory, while isolation protects these from user installed apps running in a main operating system. However, considering any application run within a trusted execution environment as "trusted" and hence allowing them unrestricted access to the computing device's resources is dangerous, as it can impact other applications running on parallel trusted execution environments on the same computing device and the operating system of the computing device itself.

Furthermore, known hardware-implemented trusted execution environments have the inherent disadvantage of lack of updateability (or at least difficult updateability). For example, a security flaw implemented in hardware is either not fixable or only with hard-deployable BIOS and/or firmware updates.

In addition, no known implementation of trusted execution environments provides sufficient levels of all three properties:

Process isolation: Access is restricted by an access control mechanism and global directories for files, settings or processes, where a process could list, read and modify items it should not access.

Spillover from one execution to the next: Despite a separate hardware with a hardened operating system and a software that provides some logical isolation, known trusted execution environments cannot fully guarantee that exactly the same environment is provided for each execution of an application code. Nor can known trusted execution environments ensure that there is no spillover from one execution of the application code to the next, potentially contaminating the subsequent execution(s).

Audit property: Due to the multiple communication paths, currently known trusted execution environments do not provide a comprehensive solution that allows attestation of all input and output of the execution of application code within an instance of a trusted execution environment and to attest the overall state of the computing environment which executed the application code and/or to attest the application code executed.

SUMMARY OF THE INVENTION

It is an object of this invention to provide a computing device configured to establish a trusted execution environment that overcomes one or more of the disadvantages of known trusted execution environments.

In particular, it is an object of the present invention to provide a flexible trusted execution environment, wherein resources of the computing device can be dynamically allocated at run-time while at the same time ensuring isolation property, audit property and authorization property of the trusted execution environment.

Furthermore, it is an object of the present invention to provide a trusted execution environment which is readily updateable, for example to optimize its performance and/or rectify security flaws.

With respect to process isolation, it is a particular object of the present invention to minimize the attack surface of the trusted execution environment to cyber-attacks. At the same time, it is a particular object of the present invention to isolate the application code executing within a trusted execution environment and limit access only to authorized resources, preventing unrestricted access to resources of the computing device outside the respective trusted execution environment.

With respect to preventing spillovers, it is a particular object of the present invention to increase the resilience and security of the trusted execution environment by ensuring a consistent environment of all instances of the execution engine for each execution of application code.

With respect to audit capabilities, it is a particular object of the present invention to attest that a certain output was generated from a specific input, executed at a specific time with specific application code, referred to as trustworthiness through attestation.

According to the present invention, the above-mentioned objects are addressed through the features of the independent claims. In addition, further advantageous embodiments follow from the dependent claims and the description.

According to the present invention, the above-mentioned objects are particularly addressed by a computing device comprising one or more processors and one or more memory devices having stored thereon computer readable instructions which, when executed by the one or more processors, cause the computing device to establish a trusted execution environment for executing application code.

According to the present invention, the trusted execution environment—established by the computing device—comprises: an execution engine configured to execute the application code; a storage module configured to provide read-only access to the execution engine for accessing the application code and a management module.

The management module is configured to receive execution request(s) to execute the application code. Having received the execution request, the management module is configured to instruct the execution engine to load the application code from the storage module and to execute the application code according to the execution request.

During execution of the application code—by the execution engine—the management module bundles all data input requested/consumed by the execution of the application code into input data stream(s). Furthermore, during execution of the application code—by the execution engine—the management module bundles all response data output generated during execution of the application code into output data stream(s). Bundling all data input and data output into input data stream(s) and output data stream(s), respectively allows the management module to capture all traffic consumed by respectively generated by the execution of the application code.

Furthermore, the management module is configured to terminate the execution engine after each execution of the application code. Hence, the present invention ensures a consistent environment of all instances of the execution engine for each execution of application code.

The management module is further configured to create an execution record of the execution of the application code by the execution engine after it has been terminated. The execution record comprises at least data indicative of said input data stream(s) and output data stream(s). According to embodiments of the present invention, data indicative of said input data stream(s) and output data stream(s) comprises the data streams themselves and/or a hash value of the respective data stream(s) and/or statistical data of the respective data streams, such as e.g. volume of data.

After its creation, the management module is configured to transmit the execution record to the requestor.

The above-identified objectives are further addressed by a computer implemented method of operating a trusted execution environment. In a first step, the method comprises initializing an execution engine as part of the trusted execution environment and configuring said execution engine for executing application code. Thereafter, a storage module is provided as part of the trusted execution environment, the storage module being configured to provide read-only access to the execution engine for accessing the application code. Furthermore, a management module is provided as part of the trusted execution environment. The management module receives execution request(s) from a requestor to execute the application code and instructs the execution engine to load the application code from the storage module and to execute the application code according to the execution request. During execution of the application code, the management module bundles requested data input, response data output to and from the execution engine into input data stream(s) and output data stream(s), respectively. After execution of the application code, the management module terminates the execution engine. Thereafter, the management module creates an execution record of execution of the application code by the execution engine. The execution record comprises data indicative of said input data stream(s) and output data stream(s). Then the execution record is transmitted by the management module to the requestor.

Further disclosed herein is a computer program product comprising computer-executable instructions which, when executed by one or more processors of a computing device causes the computing device to carry out the method according to one of the embodiments disclosed herein.

According to a further embodiment of the present invention, the trusted execution environment—established by the computing device—further comprises an initialization module. The initialization module is configured to start the execution engine in accordance with a configuration received from the management module. Thereafter, the initialization module determines a set of dependent resources of the computing device required by the application code for execution. According to a particular embodiment, the initialization module determines a set of dependent resources by extracting such information from the configuration received from the management module.

Having determined the set of dependent resources, the initialization module grants the execution engine access rights only to said set of dependent resources. Once the access rights have been granted, the initialization module instructs the execution engine to load the application code from the storage module and to execute the application code.

According to a particular embodiment, granting the execution engine access rights only to dependent resources of the computing device required by the application code for execution comprises: determining a set of capabilities required by the execution engine; requesting access token(s) corresponding to said set of capabilities from resources possessing said capabilities; and granting access rights for the execution engine to resources of the computing device according said access token(s).

According to further embodiments disclosed herein, the management module is further configured to include execution status data from the execution engine (via the initialization module) into the execution record and to terminate the instance of the execution engine (via the initialization module) if the execution status data comprises data warranting termination. According to a particular embodiment, either the execution request or the configuration of the execution engine comprises a timeout by which an execution of the application code must be completed. The management component and/or the initialization module starts a timer upon instructing the execution engine to execute the application code. If the execution engine does not report (via the execution status report) a termination before the timer exceeds the corresponding timeout, the management component terminates the execution engine resulting in a failed execution. According to a further particular embodiment, if the execution engine uses more resources than granted, e.g. more RAM, such will be reported to the management engine (via the execution status report), which in turn will terminate the execution engine.

According to further embodiments disclosed herein, the storage module is further configured to compute a hash value of the application code and provide said hash value to the management module. Accordingly, the management module includes said hash value into the execution record. In such way, the execution record comprises not only data indicative of the data traffic to and from the execution engine but also an attestation of the executed application code—in the form of its hash value.

According to further embodiments disclosed herein, the computing device is configured to run not one, but a plurality of instances of the trusted execution environment.

According to such embodiments, the computer readable instructions further cause the computing device to initialize a security monitor. The security monitor is common to a plurality of instances of the trusted execution environment. Alternatively, or additionally, a dedicated security monitor may be provided with respect to each instance of the trusted execution environment. The security monitor receives a plurality of execution requests from a platform server, the execution requests each comprising authentication data and data indicative of an application to be executed. The data indicative of an application to be executed may comprise application code or a reference to application code. The security monitor then authenticates the execution requests by verifying the authentication data. The security monitor, upon successful authentication of the execution requests, initializes a plurality of instances of the trusted execution environment. A separate instance of the trusted execution environment is initialized corresponding to each execution request. Thereafter, the security monitor forwards each execution request to the management module of the respective instance of the trusted execution environment. The security monitor receives execution records corresponding to the execution of the application codes from the management modules of the respective instances of the trusted execution environment and forwarding the execution records to the platform server.

According to particular embodiments disclosed herein, the security monitor is further configured to dynamically allocate and manage resources of the computing device, in particular resources of the one or more processors, to the plurality of instances of the trusted execution environment. According to particular embodiments disclosed herein, the security monitor is further configured to digitally sign (with an attestation key) the execution records.

According to particular embodiments disclosed herein, in addition to capturing the execution records of the plurality of instances of the execution engine, the security monitor is configured to capture and attest data indicative of a platform state related to the execution of the application code by the trusted execution environment. In particular, said platform state is captured by a directed acyclic graph. The platform state may also be captured by the management module or a separate module dedicated for this task.

As used herein, the term 'computing device' relates to any machine that can be instructed to carry out sequences of arithmetic or logical operations automatically via computer programming, comprising—but not limited to—a server computer, a network of distributed devices forming a server, a personal computer or a mobile computing device.

As used herein, the term 'processor' refers to an electronic circuit which performs operations on data, comprising—but not limited to—a microprocessor, a central processing unit CPU, a dedicated co-processor, a core of a processor having multiple processor cores.

As used herein, the term 'memory device' refers to any device suitable to retrievably store data, comprising—but not limited to—semiconductor-based storage devices (both volatile and non-volatile), magnetic- and/or optical and/or mechanical and/or biological material-based storage devices.

As used herein, the term 'application code' refers to any form of computer-readable instructions which is executed by a computing device to perform a certain task. The application code may be provided in various forms, such as—but not limited to—a source code, an executable binary (machine code) or a collection thereof known as a library.

A further important aspect of a trusted execution environment is to ensure the immutability of the application code, i.e. to prevent the application code from being altered and to be able to provide certainty about the actual application code executed.

A known mechanism to do so is to calculate a hash value of the application code and verify the calculated hash value against a previously determined hash value of a valid application code, for example a hash value of a cryptographically signed copy of the application code. Since the execution of the application code is dependent on the verification of its calculated hash value, the two steps—calculating the hash value and execution of the application code—are necessarily sequential. Hence, such known mechanisms—designed to ensure immutability of the application code—suffer from the deficiency that they cannot guarantee that the application code on the storage module of the trusted execution environment has not been altered between the calculation of its hash value and its execution.

In an attempt to address this deficiency, known trusted execution environments rely on providing the execution engine of a trusted execution environment merely read-only access to the application code stored on the storage module. While limiting access for the execution engine to the storage module does prevent altering of the application from within the trusted execution environment, it does not provide protection against the application code being altered from other components of the computing device, in particular to components which already have full access rights to the storage module, such as the requestor or the components that have the access rights to store application code on the storage module. Since there must always be at least one component of the computing device that does have write privileges to the storage module to store the application code, known trusted execution environments cannot provide absolute guarantee that the application code has not been altered between calculating/verifying the hash value and its execution.

Therefore, further disclosed herein is a computing device for establishing a storage module for storing a data file and a computer implemented method for storing a data file on a storage module as well as a corresponding computer program product.

It is an object of the disclosed computing device for establishing a storage module for storing a data file is to guarantee integrity of a data file made available to a data consumer—in particular the execution engine of a trusted execution environment- and also provide a hash value of the data file, attesting with absolute certainty that the hash value corresponds to the data file made available to a data consumer.

The above-mentioned objects are particularly addressed by a computing device comprising one or more processors and one or more memory devices having stored thereon computer readable instructions which, when executed by the one or more processors, cause the computing device to establish a storage module for storing a data file. The storage module is configured to load a data file from a data source into the storage module, to compute a hash value of the data file loaded into the storage module and to make said hash value available to a hash value consumer. The storage module is further configured to grant read-only access to data consumer(s) for accessing said data file loaded into the storage module. In order to ensure that no compromised data file is accessed by a data consumer, the storage module is configured to detect any change and/or attempted change of the data file and terminate all data consumers which have been granted access to the data file. Hence, the storage module of the present disclosure ensures that even if the data files would be somehow altered, the data consumers are not provided with a data file which does not correspond to the computed hash value. This guarantees absolute certainty that the hash value does indeed correspond to the data file made accessible to the data consumers. It is thus impossible for a data consumer to access any data file from the storage module which does not correspond to the hash value.

The above-identified objectives are further addressed by a computer implemented method for storing a data file on a storage module of a computing device. The method comprises loading a data file from a data source—such as a file system—into the storage module. According to a first aspect, the data file is loaded onto the storage module in that the contents of the data itself is copied onto the storage module. According to a further aspect, the data file is loaded onto the storage module in that a reference to the location of the data file on the data source (such as a file reference within a file system or a memory block) is stored on the storage device. Such is advantageous in cases when the data file is large and copying it would lead to higher resource consumption. According to an even further aspect, the data file is loaded onto the storage module sequentially in multiple segments, the storage module acting as a temporary cache of a certain segment of the data file, the next segment being loaded by the storage module after the preceding segment has been read by the data consumer.

After being loaded, a hash value of the data file (loaded into the storage module) is computed. The hash value is computed using a known hashing algorithm, such as—but not limited to—Secure Hash Algorithms SHA-0 to 3, etc. The hash value is then made available to a hash value consumer. Thereafter, read-only access is granted to a data consumer(s) for accessing said data file as loaded into the storage module. In order to ensure that no compromised data file is accessed by a data consumer, any change and/or attempted change of the data file is detected and all data consumers—which have been granted access to the data file—are terminated.

According to further aspects of the present disclosure, the storage module is configured to prevent any further loading of a data file. In other words, the storage module is configured as a load-once storage, allowing one single "read into memory" operation. Before any data file can be loaded again, the storage module must be restarted, wherein restarting the storage module causes any data file to be permanently erased from the storage module. This approach is particularly advantageous as it provides an additional security feature to ensure that the hash value corresponds to the data file provided to the data consumers, completely eliminating the so-called time of measurement vs. time of use problem, in that no data file can be read (time of use) from the storage module other than the data file on which the hash value has been calculated (time of measurement).

According to various aspects disclosed herein, there are different ways to detect a change and/or attempted change of the data file. According to one aspect, the storage module is configured to detect an attempted change of the data file by identifying any Read into Memory instructions received by the storage module. Since a data file can only be loaded into the storage module by such an instruction, this mechanism allows detection of any attempt to change the data file.

According to an another aspect, the storage module is configured to detect a change of the data file as stored at the data store by computing a hash value of the data file as stored at the data store and comparing it with the hash value of the data file loaded into the storage module. Such is particularly advantageous in aspects where the application code is loaded onto the storage module as a reference to a location on a data store (such as a reference to a storage location, a memory block and offset, etc.).

According to a further aspect disclosed herein, the storage module is further configured to grant read-only access to the data consumer(s) for accessing said data file only after the hash value consumer has accessed the hash value. This prevents situations where a data consumer would access a data file and not be able to retrieve its hash value for whatever reason. In other words, granting access to the data file only after the hash value consumer has accessed the hash value ensures that data consumers only access data files with a hash value being read.

According to further aspects disclosed herein, the storage module is further configured to establish a server-client relationship with the data consumer(s) which have been granted access to the data file. The storage module being the server and the data consumer(s) being client(s). Establishing a server-client relationship between the storage module and the data consumer(s) is advantageous since terminating a server automatically terminates each of its clients, thereby automating the prevention of a data consumer accessing a changed data file.

The storage module according to the present disclosure is particularly advantageous for use within a trusted execution environment, wherein the data file comprises application code; the data consumer is an execution engine and the hash value consumer is a management module of the trusted execution environment.

An important aspect of a trusted execution environment is the ability to attest the code executed by the computing environment.

In order to scale up the attestation and/or verification of application code from a single data file, a known approach is to repeatedly calculate a hash value of an entire data storage such as a partition or file system (or at least a part thereof, such as a folder). A change of the hash value is indicative that some part of the data storage has been altered/compromised. However, relying on a single hash value for the entire data storage has the major disadvantage that, when a change is detected, one is unable to identify which part (data file) of the data storage has been altered.

In order to address this disadvantage, a so-called Merkle tree or hash tree is employed in which every leaf node is labeled with the hash value of a data file/data block, and every non-leaf node is labeled with the hash value of the labels of its child nodes. Hash trees allow efficient and secure attestation and/or verification of the contents of large data structures (such as file system) but also identification of the compromised data file/data block by navigating the hash tree from its top to the compromised leaf.

In addition to ensuring the immutability of a data storage, an important aspect of a trusted execution environment is to be able to attest and/or verify integrity of the entire computing environment. However, a single hash tree is not capable of offering different views of different tenants of a computing environment. Also, hash trees are not able to capture different kinds/types of dependency relationships and are prone to produce redundant sub-nodes when dependencies are shared (such as shared libraries).

Therefore, further disclosed herein is a computer implemented method for attesting a state of a computing environment running a plurality of components, a computer program product as well as a computer-readable storage module comprising instructions which, when executed by a computing device, cause the computing device to carry out a method for attesting a state of a computing environment running a plurality of components.

In particular, it is an object of the disclosed method for attesting a state of a computing environment to provide a method that is able to attest and/or monitor the state of an entire computing environment, in particular the integrity of a trusted execution environment. Applicant has recognized that—in addition to the state of components—a comprehensive image of a computing environment should capture also dependency relationships between components, such as parent-child relationship(s), client-server dependency(s) or software package/binary/library dependency(s).

Hence, it is an object of the method for attesting a state of a computing environment to provide a method that is able to attest and/or monitor the state of an entire computing environment comprising an immutable record of a state of components as well as a state of dependency relationships, such as parent-child; client-server; and/or software package/binary/library dependencies.

The term 'component' as used herein refers to an entity within a computing environment such as a software package or a module that encapsulates a set of related functions (or data). A (software) component is basically a software unit with a well-defined interface and explicitly specified dependencies. A component can be as small as a block of code, or it can be as big as an entire application. A component as executed (by a processor of a computing device) is a process. A component is a system element offering a predefined service(s) and able to communicate with other components.

According to the present disclosure, the above-mentioned objects are addressed through the features of the independent claims. In addition, further advantageous aspects follow from the dependent claims and the description.

In summary, the above-mentioned objects are addressed by generating an immutable attest (record) of a computing environment using a directed acyclic graph, all components as well as all dependency relationships between the components of the computing environment being captured in the graph.

According to the present disclosure, the above-mentioned objects are particularly addressed by a computer implemented method of attesting a state of a computing environment comprising a plurality of components and a plurality of dependency relationships between the plurality of components, the method comprising the following steps:
A) generating a directed acyclic graph comprising a plurality of nodes and a plurality of directed edges connecting the nodes;
A1) associating a node with each component of the computing environment, such as by labelling/naming the node with a component ID (referred to as a component node).
A2) associating a node with each dependency relationship, such as by labelling/naming the node with a relationship ID (referred to as a dependency node). Furthermore, the node is assigned with a hash value of data descriptive of said dependency relationship, such as an XML element. The data descriptive of a dependency relationship comprises at least: data identifying each component included in the dependency relationship (such as a component ID, a component reference or the like) and data identifying the dependee and depender components of the dependency relationship.
A3) connecting, using directed edges, each node associated with a dependency relationship (each dependency node) to node(s) associated with component(s) (component node) included in the respective dependency relationship (either as depender or dependee);
A4) assigning each node with a hash value of all of its subnodes, in particular with a hash value of the concatenation of the hash values of all subnodes, wherein the hash of a node comprises a hash value of its label and data fields;
B) generating an attest of the state of the computing environment, using the directed acyclic graph.

The method disclosed herein is particularly advantageous as it allows creating an immutable attestation of the state of a computing environment capturing not only the components running, but also all dependencies between the components in a single structure, namely a directed acyclic graph, all information represented by the graph being hashed.

According to aspects disclosed herein, said set of dependency relationships comprise one or more dependency relationship types:
Parent-child dependency(s), wherein a parent-child dependency(s) is indicative of a child component being spawned by a parent component, the child component being the depender and the parent component being the dependee.
Client-server dependency(s), wherein a client-server dependency is indicative that a client component consumes service(s) provided by a server component, the client component being the depender and the server component being the dependee. The data descriptive of a client-server dependency(s) further comprises data identifying the service(s) (such as name, type, protocol etc. of service) of the server component consumed by the client component.
Software package/binary/library dependency(s), wherein a software package/binary/library dependency is indicative that, when executing, a component executes computer-readable instructions (such as executable binaries) and/or data (such as raw data) comprised by a software package and/or library.

According to a particular aspect, the directed edges—which connect dependency nodes to component nodes:
are directed from the component node associated with the dependee towards the dependency node (subnode) associated with the respective dependency relationship; and/or
are directed from the dependency node towards the component node (subnode) associated with the depender of the respective dependency relationship.

According to further aspects disclosed herein, the method further comprises the step of determining whether integrity of the computing environment has been compromised by detecting a change in the hash values associated with any node of the directed acyclic graph. The term 'compromised' as used herein refers to any alteration of any component and/or dependency relationship captured by the directed acyclic graph. Having determined that the computing environment has been compromised, aspects of the disclosed method further comprise identifying a compromised component by finding the node, assigned to said component, with a changed hash value; and/or identifying a compromised dependency relationship by finding the node, assigned to said dependency relationship, with a changed hash value.

According to various aspects disclosed herein, the nodes of the directed acyclic graph are further associated with a hash value of:

binary(s) used to execute the respective component; and/or dynamic library(s) used to execute the respective component; and/or source code of the respective component; and/or source code of the software library(s); and/or raw data file(s); and/or a compiler(s) that has been used to compile said source code of the respective component into computer-readable instructions executed within the respective component.

According to further aspects disclosed herein, one or more nodes of the directed acyclic graph is further associated with version information for each component. The method further comprises cross-referencing said version information with a database of vulnerable versions of components and terminating the computing environment running any component whose version information is flagged as unsecure in said database. Additionally, a Security Information and Event Management System (SIEM) may be notified about a vulnerability of the computing environment if any component is associated with version information listed in said database of vulnerable versions of components.

According to further aspects disclosed herein, the nodes of the directed acyclic graph are further associated with licensing information for each component. Accordingly, the method further comprises the step of attesting compliancy of the computing environment with a specified licensing requirement by verifying that all component nodes of the directed acyclic graph satisfy said licensing requirement. A node satisfies a licensing requirement if the node is associated with licensing information satisfying the licensing requirement, such as referencing a specific license/or license type defined by the licensing requirement. Alternatively, or additionally, the licensing requirement may define a minimum set of criteria to be satisfied and/or a minimum licensing version (such as GPLv2 or later).

The method of attesting a state of a computing environment is particularly advantageous for attesting the state of a trusted execution environment comprising an execution engine executing said plurality of components; a management module configured to control a life cycle(s) of the execution engine; and a storage module for application code to be executed by component(s) of the execution engine. Accordingly, components executed by the execution engine comprise:

execution of application code provided for execution to the trusted execution environment by a requestor; and/or components started during execution of said application code according to one or more of said parent-child relationship(s); and/or services started by the execution engine according to one or more of said client-server dependency(s); and/or executable binaries of libraries loaded by the execution engine according to one or more of said software package/binary/library dependency(s).

The above-identified objectives are further addressed by a computing device comprising one or more processors and one or more memory devices having stored thereon computer readable instructions which, when executed by the one or more processors, cause the computing device to carry out the method of attesting a state of a computing environment according to one of the aspects disclosed herein.

The above-identified objectives are further addressed by a computer program product comprising computer-executable instructions which, when executed by a processor of a computing device causes the computing device to carry out the method of attesting a state of a computing environment according to one of the aspects disclosed herein.

BRIEF DESCRIPTION OF THE DRAWINGS

The present invention will be explained in more detail, by way of example, with reference to the drawings in which.

DETAILED DESCRIPTION OF EMBODIMENTS

Figure 1:
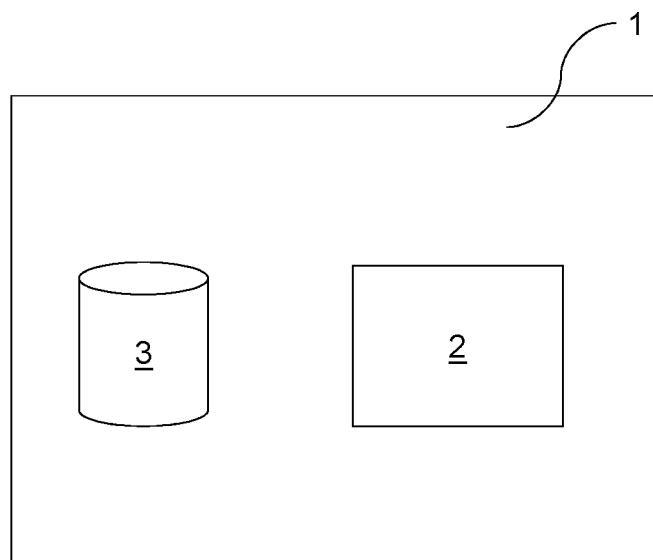
FIG. 1: shows a highly schematic block diagram of a computing device comprising a processor and a memory device.

FIG. 1 shows a highly schematic block diagram of a generic computing device 1 comprising a processor 2 and a memory device 3. The memory device 3 has stored thereon computer readable instructions which, when executed by the one or more processors 2, cause the computing device 1 to establish a trusted execution environment 100 as shall be described with reference to FIGS. 2 and 3.

Figure 2:
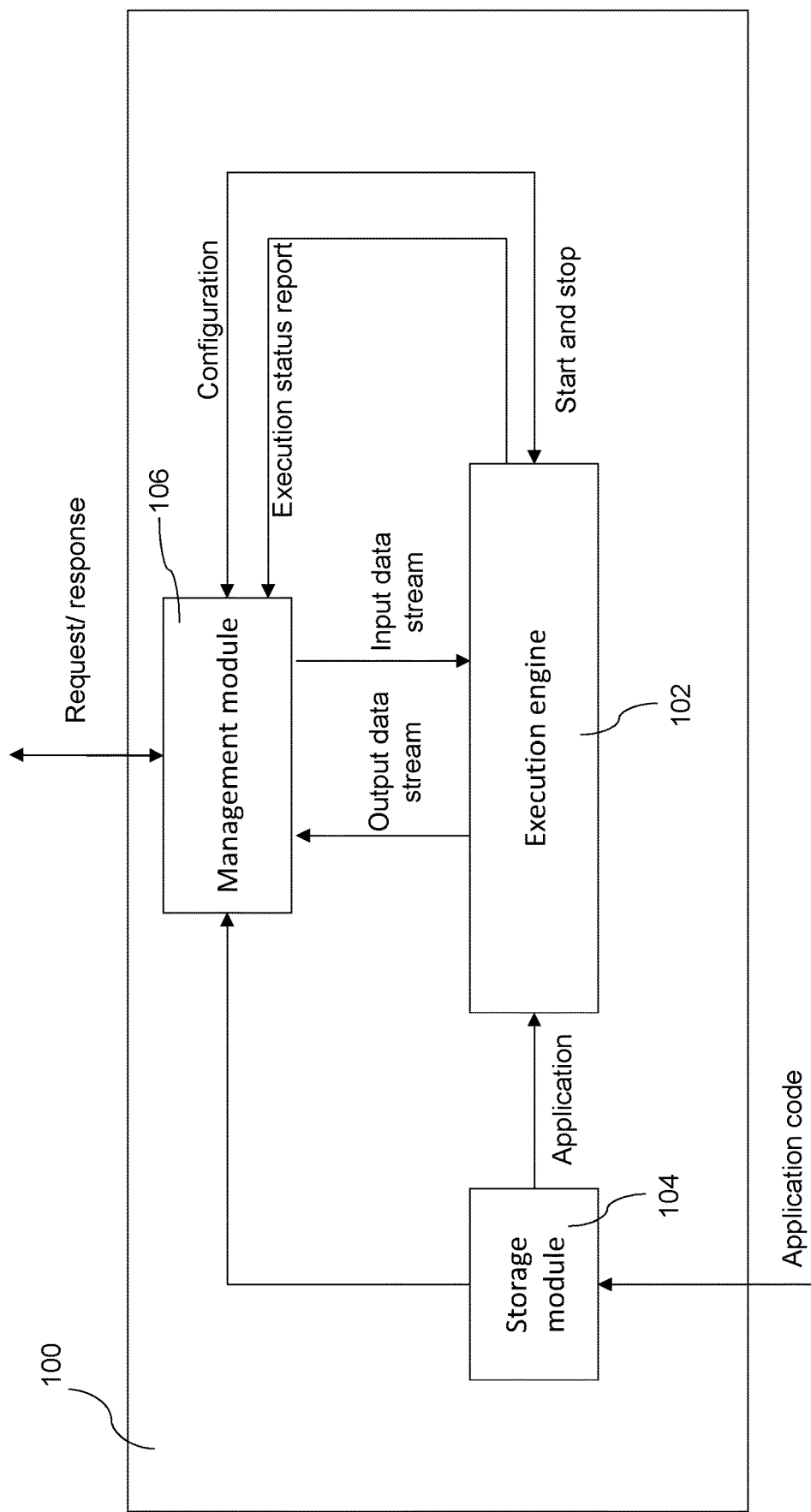
FIG. 2: shows a schematic block diagram of a trusted execution environment according to the present invention.

FIG. 2 shows a schematic block diagram of the trusted execution environment 100 according to the present invention. In summary, a trusted execution environment 100 is a computing environment which is capable of executing application code and creates a record of that execution called execution record. The trusted execution environment 100 is configured such as to fulfill three properties: Physically and logically secure the execution of the application code from any interference (Isolation Property); Creating an immutable record of the execution of the application code, detailing input, output, time and device state (Audit Property); and Restrict access to start an execution to authorized entities (Authorization Property).

The executed code is provided as an application code and deployed to a storage module 104 of the trusted execution environment 100. The application code is dynamically loaded with each execution request. As illustrated on FIGS. 2 and 3, the storage module 104 provides read-only access to the execution engine 102 for accessing the application code.

A management module 106 of the trusted execution environment 100 is arranged to receive requests for execution by an outside system (hereafter referred to as the requestor), coordinating the execution of the requests sending the response back to the requestor once the execution is finished.

The actual execution of the application code is performed by an execution engine 102 at the instruction of the management module 106.

The execution engine 102 that runs the application code is a separate disposable process isolated from the rest of the computing device. As illustratively shown on FIGS. 2 and 3, all data input, response data output to and from the execution engine 102 is bundled (by the management module 106) into input data stream(s) and output data stream(s), respectively. In addition, according to further embodiments, the execution engine 102 bundles data related to execution status from the execution engine 102 into an execution status report.

Shown on the figures with the label "Start and stop", the management module 106 starts and terminates the execution engine 102, the management module 106 being configured to instruct the execution engine 102 to load the application code from the storage module 104 and to execute the application code according to the execution request as well as to terminate the execution engine 102 after execution of the application code.

Figure 3:
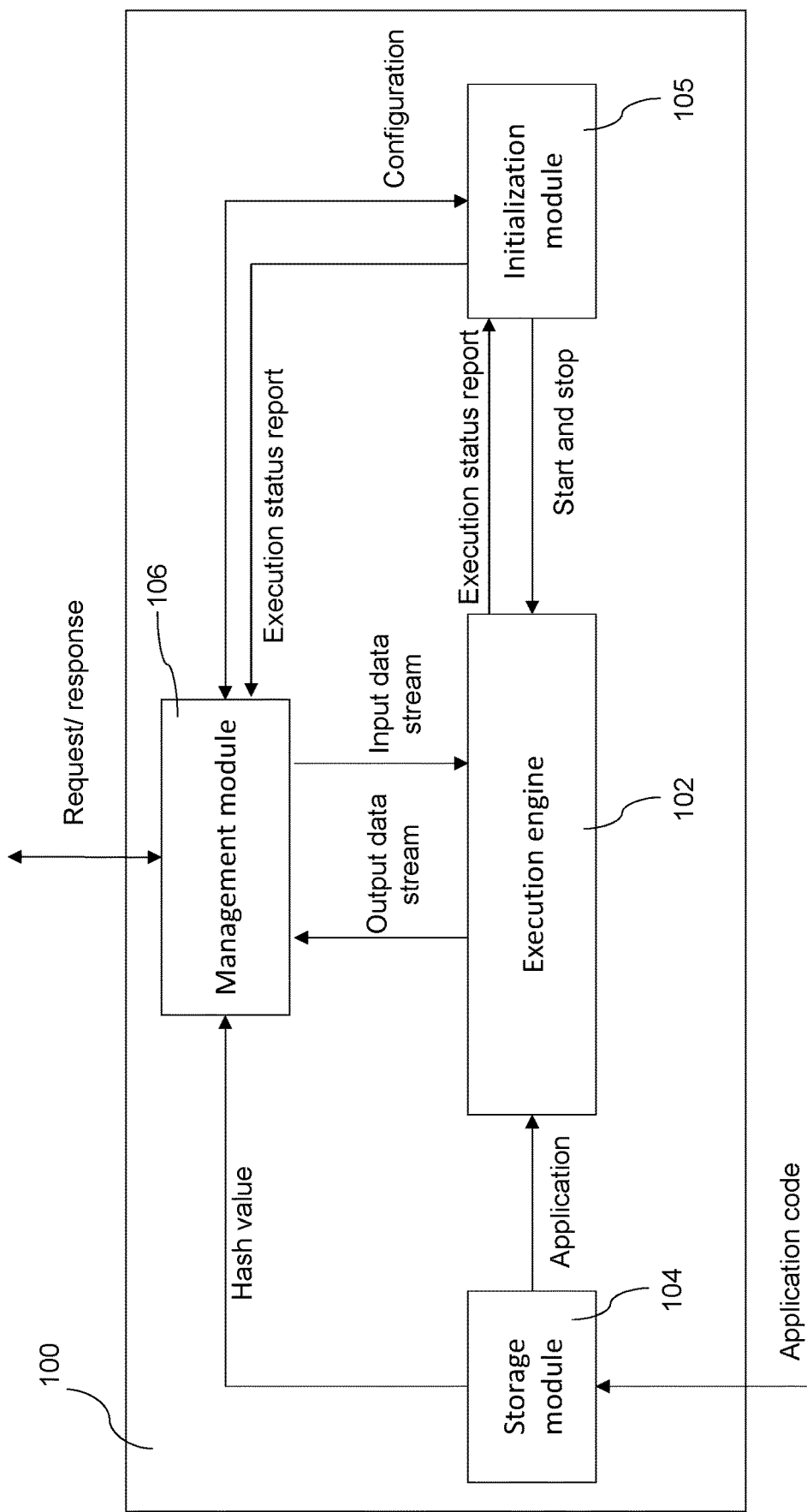
FIG. 3: shows a schematic block diagram of a trusted execution environment according to the present invention.

FIG. 3 shows a schematic block diagram of a trusted execution environment 100 according to the present invention, further comprising an initialization module 105. In summary, the management module 106 delegates the task of initializing the execution engine 102 to the initialization module 105. The initialization module 105 performs the task of initializing the execution engine 102 based on a configuration by the management module 106. This delegation of tasks has the advantage that complexity of the individual modules is reduced. Furthermore, the initialization module 105 is configured to determine a set of dependent resources of the computing device 1 required by the application code for execution and grant the execution engine 102 access rights only to said set of dependent resources (using capability based security). Thereafter, the initialization module 105 instructs the execution engine 102 to load the application code from the storage module 104 and to execute the application code.

According to further embodiments disclosed herein, the computer readable instructions, when executed by the one or more processors 2, further cause the computing device 1 not only to establish a single trusted execution environment 100, but a platform of a plurality of trusted execution environments 100.

Figure 4:
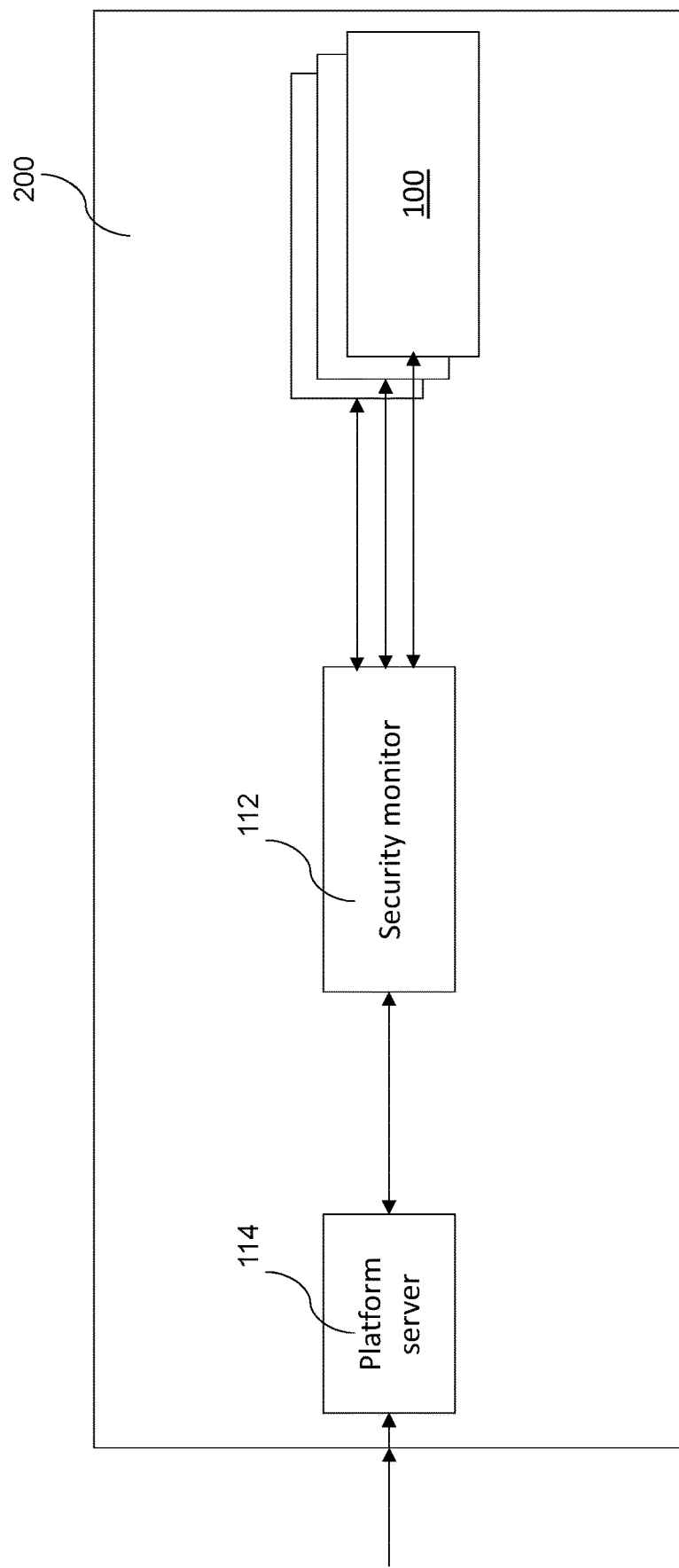
FIG. 4: shows a schematic block diagram of a trusted execution platform according to the present invention.

FIG. 4 shows a schematic block diagram of a trusted execution platform 200. The trusted execution platform 200 comprises a security monitor 112 established by the computing device 1 and a platform server 114. The security monitor 112 is communicatively connected to the platform server 114 to receive execution requests. The security monitor 112 is configured to initialize a plurality of instances of the trusted execution environment 100 corresponding to the plurality execution requests. A dedicated instance of the trusted execution environment 100 is initialized for each execution request, thereby ensuring an isolated and clean environment for each execution of application code. The security monitor 112 receives execution records corresponding to the execution of the application codes from the management modules 106 of the respective instances of the trusted execution environment 100 and forwards the execution records to the platform server 114.

According to particular embodiments disclosed herein, the security monitor 112 is further configured to dynamically allocate and manage resources of the computing device 1, in particular resources of the one or more processors 2, to the plurality of instances of the trusted execution environment 100. Dynamically allocating and managing resources between the trusted execution environments 100 of the trusted execution platform 200 provides unprecedented flexibility to the trusted execution platform 200 of the present invention, a flexibility that no known implementation of a trusted execution environment is able to provide.

Turning now to FIGS. 5 to 9, methods disclosed herein shall be described with reference to sequence diagrams.

Figure 5:
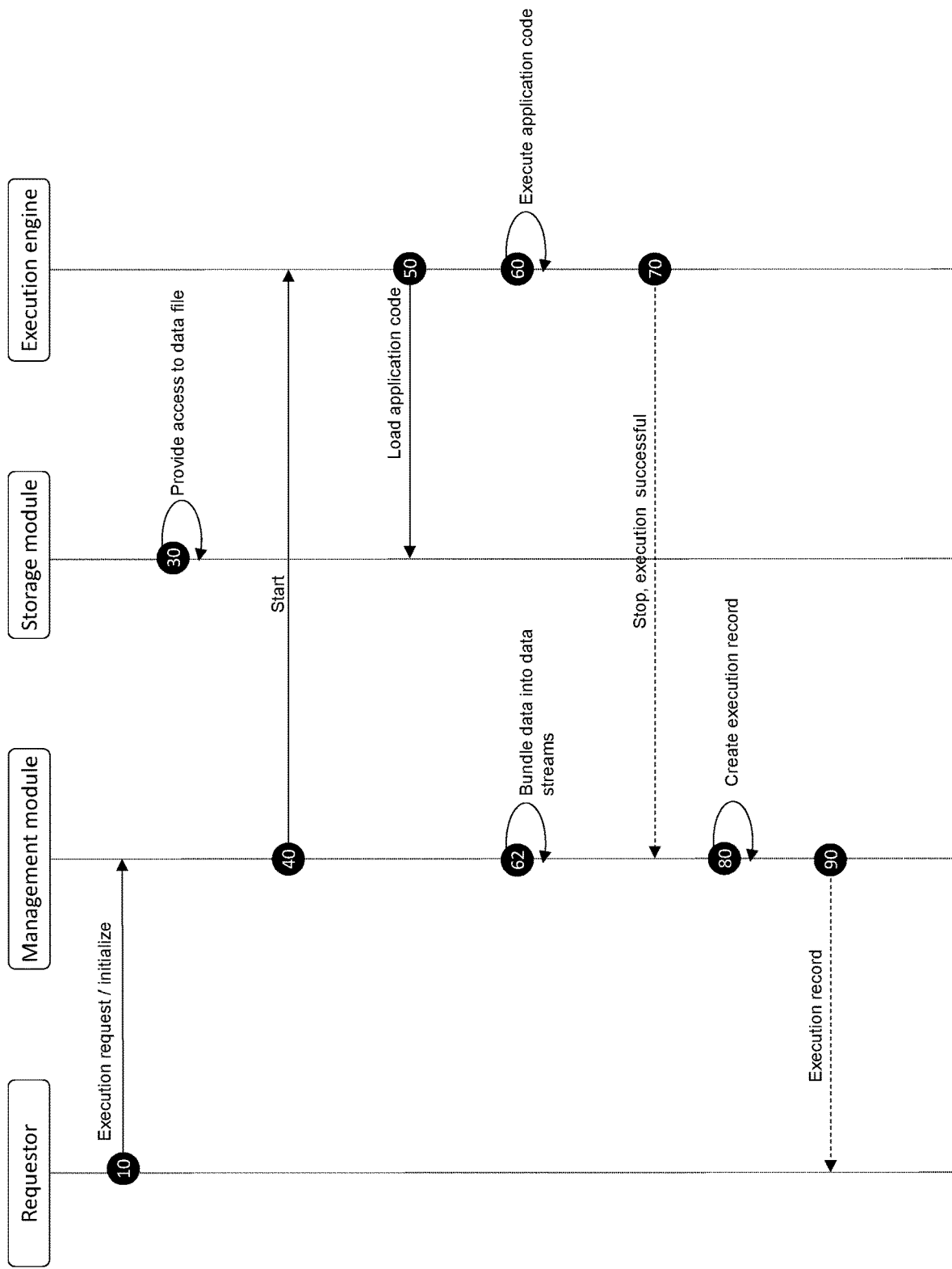
FIG. 5: shows a sequence diagram of a method of operating a trusted execution environment according to the present invention.

FIG. 5 shows a sequence diagram of a method of operating a trusted execution environment 100 for executing application code.

In a step 10, the management module 106 receives execution request(s) from a requestor to execute the application code. Also as part of step 10, the trusted execution environment 100 is initialized, wherein a storage module 104, a management module 106 as well as an execution engine 102 are provided as part of the trusted execution environment 100.

In a step 30, the storage module 104 provides read-only access to the execution engine 102 for accessing the application code. Thereafter, in a step 40, the management module 106 initializes the execution engine 102 and instructs it to load the application code from the storage module 104. In step 50, the execution engine 102 loads the application code from the storage module 104 as instructed. Then, in step 60, the execution engine 102 executes the application code according to the execution request. In the background, in a step 62, the management module 106 bundles requested data input, response data output to and from the execution engine 102 into input data stream(s) and output data stream(s), respectively.

After execution of the application code, in step 70, the execution engine 102 terminates and reports successful execution to the management module 106. Thereafter, in step 80, the management module 106 creates an execution record of execution of the application code by the execution engine 102 comprising data indicative of said input data stream(s) and output data stream(s). Finally, in step 90, the management module 106 transmits the execution record to the requestor.

Figure 6:
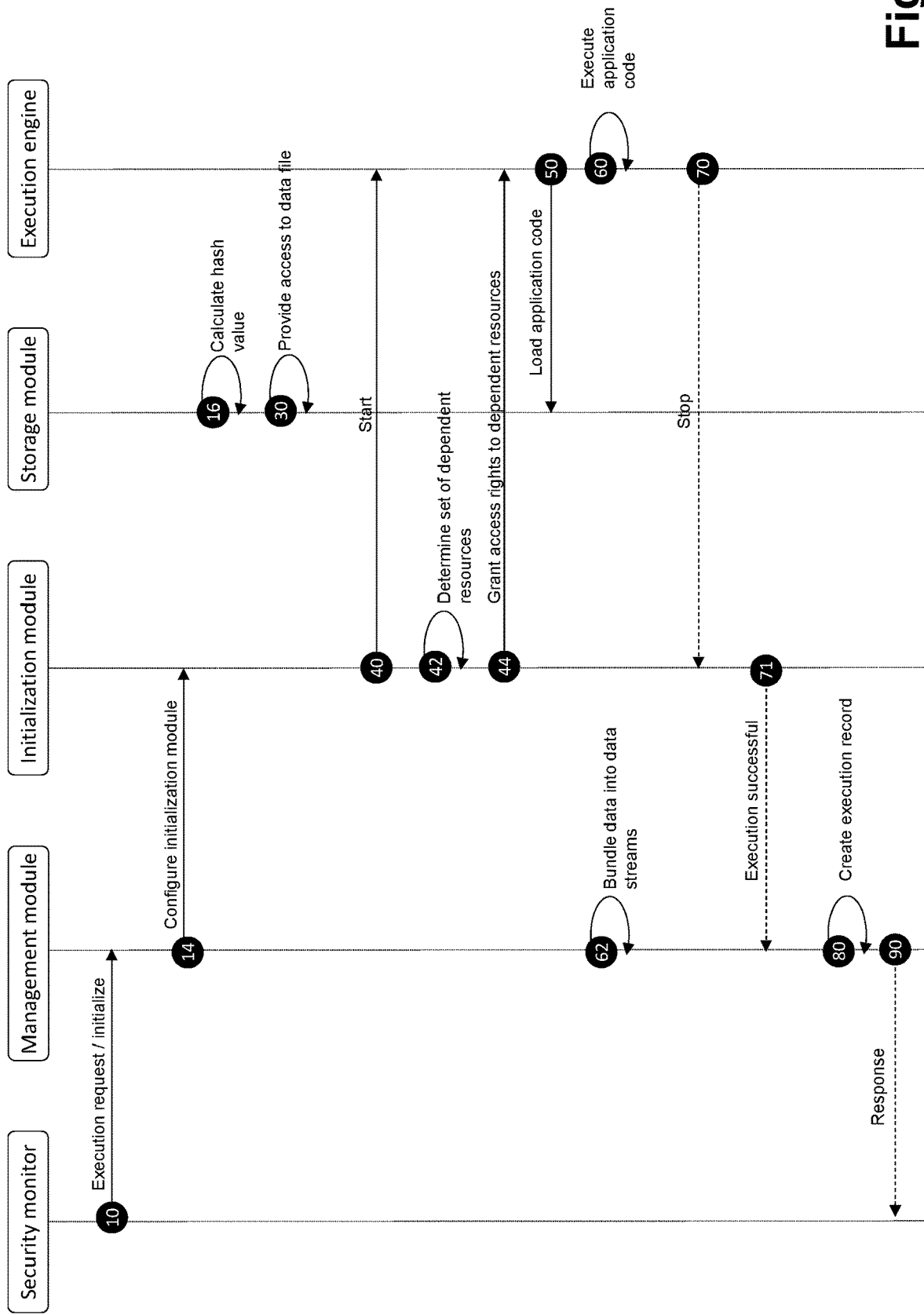
FIG. 6: shows a further sequence diagram of a method of operating a trusted execution environment according to the present invention.

FIG. 6 shows a further sequence diagram of a method of operating a trusted execution environment according to the present invention, showing details of how the management module 106 delegates the task of initializing the execution engine 102 to the initialization module 105. In a step 14, the management module 106 configures the initialization module 105. In contrast to the sequence diagram of FIG. 5, in step 40 it is the initialization module 105 that initializes the execution engine 102, based on a configuration by the management module 106. In a step 42, the initialization module 105 determines a set of dependent resources of the computing device 1 required by the application code for execution. Thereafter, in step 44, the initialization module 105 grants the execution engine 102 access rights only to said set of dependent resources.

According to embodiments disclosed herein, granting the execution engine 102 access rights to dependent resources of the computing device 1 required by the application code for execution comprises:
  determining a set of capabilities required by the execution engine 102, such as—but not limited to:
  NIC (Network Interface Card)
  ROM (Read-Only Memory)
  File system
  IO Memory (Input Output Memory)
  RAM (Random Access Memory)
  Real-time Clock
  Timer
  requesting access token(s) corresponding to said set of capabilities from resources possessing said capabilities; and
  granting access rights for the execution engine 102 to resources of the computing device 1 according said access token(s).

This security model is referred to as capability-based security and is advantageous since the attack surface of a specific component is limited to the bare minimum. A capability is defined to be a protected object reference which, by virtue of its possession by a user process (e.g. the execution engine), grants that process the capability to access with an object in certain ways, such as reading data associated with an object, modifying the object, executing the data in the object as a process, and other conceivable access rights. The capability logically comprises a reference that uniquely identifies a particular object (resource) and a set of one or more access rights.

Also shown on FIG. 6 is step 16, wherein—before providing access to the application code, the storage module 104 computes a hash value of the application code and provides said hash value to the management module 106. Accordingly, the management module 106 further includes said hash value into the execution record of the respective application code. Hence, an immutable record of the execution of the application is created.

As shown in the sequence of steps 70, 71, the task of monitoring the termination of the execution engine 102 is also delegated to the initialization module 105. Overall, the delegation of tasks (by the management module 106 to the initialization module 105) has the advantage that complexity of the individual modules is reduced.

Figure 7:
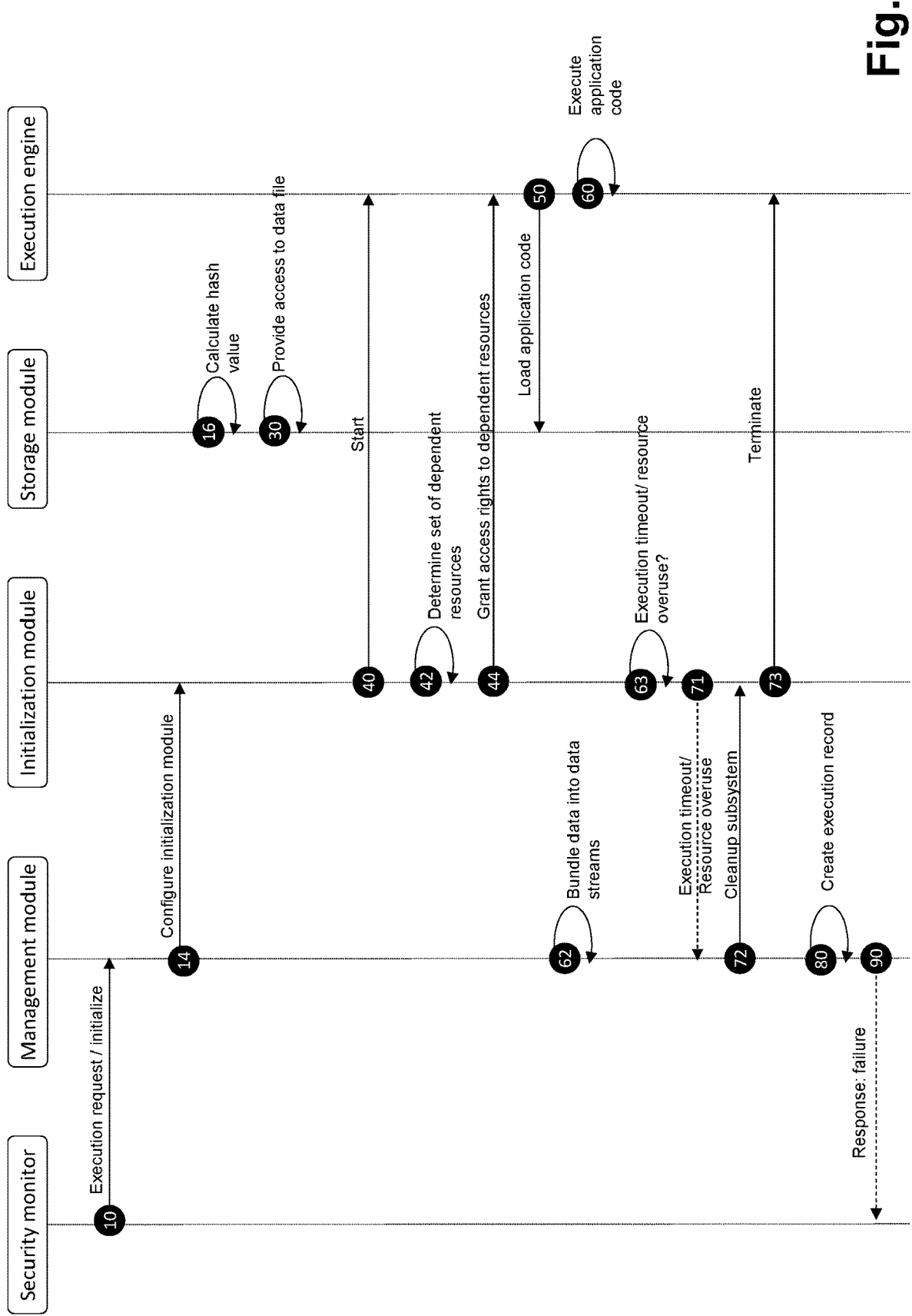
FIG. 7: shows a further sequence diagram of the method of operating a trusted execution environment according to the present invention, wherein an execution timeout leads to a failed execution.

FIG. 7 shows a further sequence diagram of the method of operating a trusted execution environment 100, wherein an execution timeout/or a resource overuse leads to a failed execution. As illustrated, in a step 63, the initialization module 105 monitors the resource consumption and execution status report of the execution engine 102. In case of an execution timeout and/or a resource overuse—in a step 71—the initialization module 105 reports the execution timeout and/or resource overuse to the management module 106, which—in a step 72—instructs the initialization module 105 to cleanup the subsystem, namely the execution engine 102. Thereafter—in a step 73—the initialization module 105 terminates the execution engine 102. An execution timeout occurs when the execution engine 102 has been executing the application code for a period longer than a timeout defined for the completion of the execution. A resource overuse occurs, when the execution engine 102 uses and/or attempts to use more resources than allocated by the initialization module 105. After the execution engine 102 being terminated early—in step 73—the response by the management module 106 to the security monitor 112 comprises data indicative of the reason for the termination of the execution engine 102.

Figure 8:
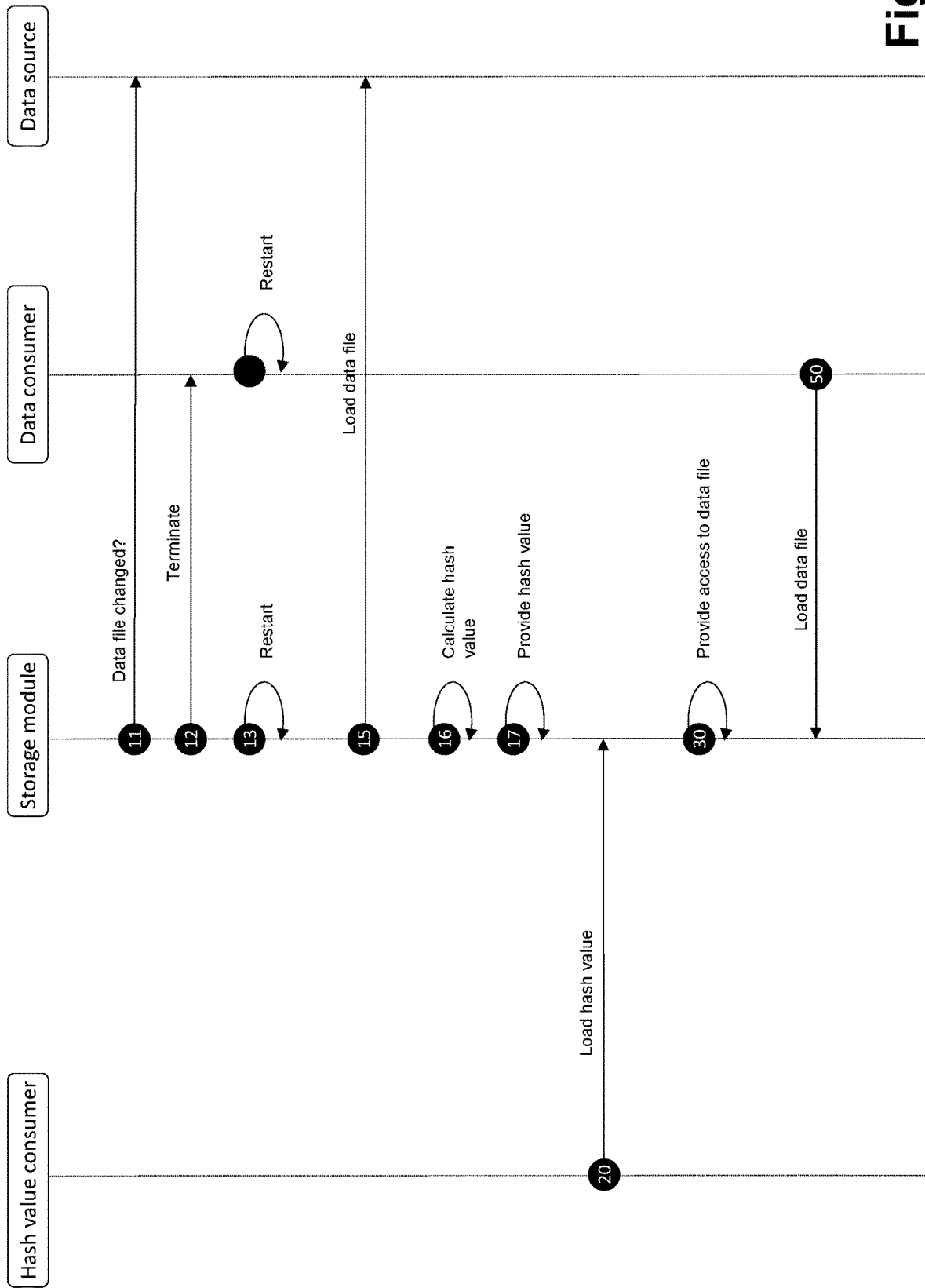
FIG. 8: shows a sequence diagram of a method for storing a data file on a storage module according to the present disclosure.

FIG. 8 shows a sequence diagram of a method for storing a data file on a storage module 104 according to the present disclosure.

In step 11, the storage module 104 detects any change and/or attempted change of the data file. According to various aspects disclosed herein, there are different ways to detect a change and/or attempted change of the data file. According to one aspect, the storage module 104 detects an attempted change of the data file by identifying any "Read into Memory" instructions received by the storage module 104. Since a data file can only be loaded into the storage module 104 by such an instruction, this mechanism allows detection of any attempt to change the data file.

According to an another aspect, the storage module 104 is configured to detect a change of the source data file (as stored at the data source) by computing a hash value of the data file as stored at the data store and comparing it with the hash value of the data file loaded into the storage module 104.

If the storage module 104 detects that the data file changed and/or there was an attempt to change the data file, in step 12, the storage module 104 terminates all data consumers which have been granted access to the data file. Furthermore, in step 13—the storage module 104 restarts itself upon detection of a change and/or attempted change of the data file. Only after restarting does the storage module 104 allow another data file to be loaded. Restarting the storage module 104 leads to any data file to be permanently erased from the storage module 104.

While the steps 11 to 13 are shown on the figures at a particular phase of the sequence illustrated on the sequence diagram, it must be emphasized, that the storage module 104 continuously monitors whether the data file has changed/whether there has been an attempt to change the data file, and initiates steps 12 and 13 accordingly. It is also to be noted, that there is a need to monitor whether the data file has changed on the data source when the application data is loaded onto the storage module 104 as a reference to the data source.

After the storage module 104 has been initialized—in a step 15—a data file is loaded from a data source into the storage module 104. In particular, the data file is loaded into the storage module 104, in that a "Read into Memory" instruction is sent to the storage module 104, with a path/reference of the data file passed on as a parameter of the "Read into Memory" instruction. According to aspects disclosed herein, the data source is a file system (physical or virtual) or a network connected data source, such as a remote data storage (e.g. referenced by a network path). Alternatively, or additionally, the data source may be a database, such as a relational database or the like.

After the data file has been loaded into the storage module 104, in step 16, the storage module 104 computes a hash value of the data file. It is important to note that the hash value of the data file as loaded into the storage module 104 is calculated and not a hash value of the data file on the data source. Thereafter, in a step 17, the storage module 104 makes the hash value available to a hash value consumer. The hash value is computed using a known hashing algorithm, such as—but not limited to—Secure Hash Algorithms SHA-0 to 3.

The storage module 104 as described herein is referred to as a load-once hashing ROM.

As illustrated on FIG. 8, according to a particular aspect disclosed herein, the storage module 104 grants read-only access to the data consumer(s) for accessing the data file—step 30—only after the hash value consumer has accessed the hash value—step 20. This prevents situations where a data consumer would access a data file and not be able to retrieve its hash value because the storage module 104 has been restarted in the meanwhile (e.g. due to an attempted change of the data file). In other words, granting access to the data file only after the hash value consumer has accessed the hash value ensures that data consumers only access data files—step 50—with a hash value being read.

Figure 9:
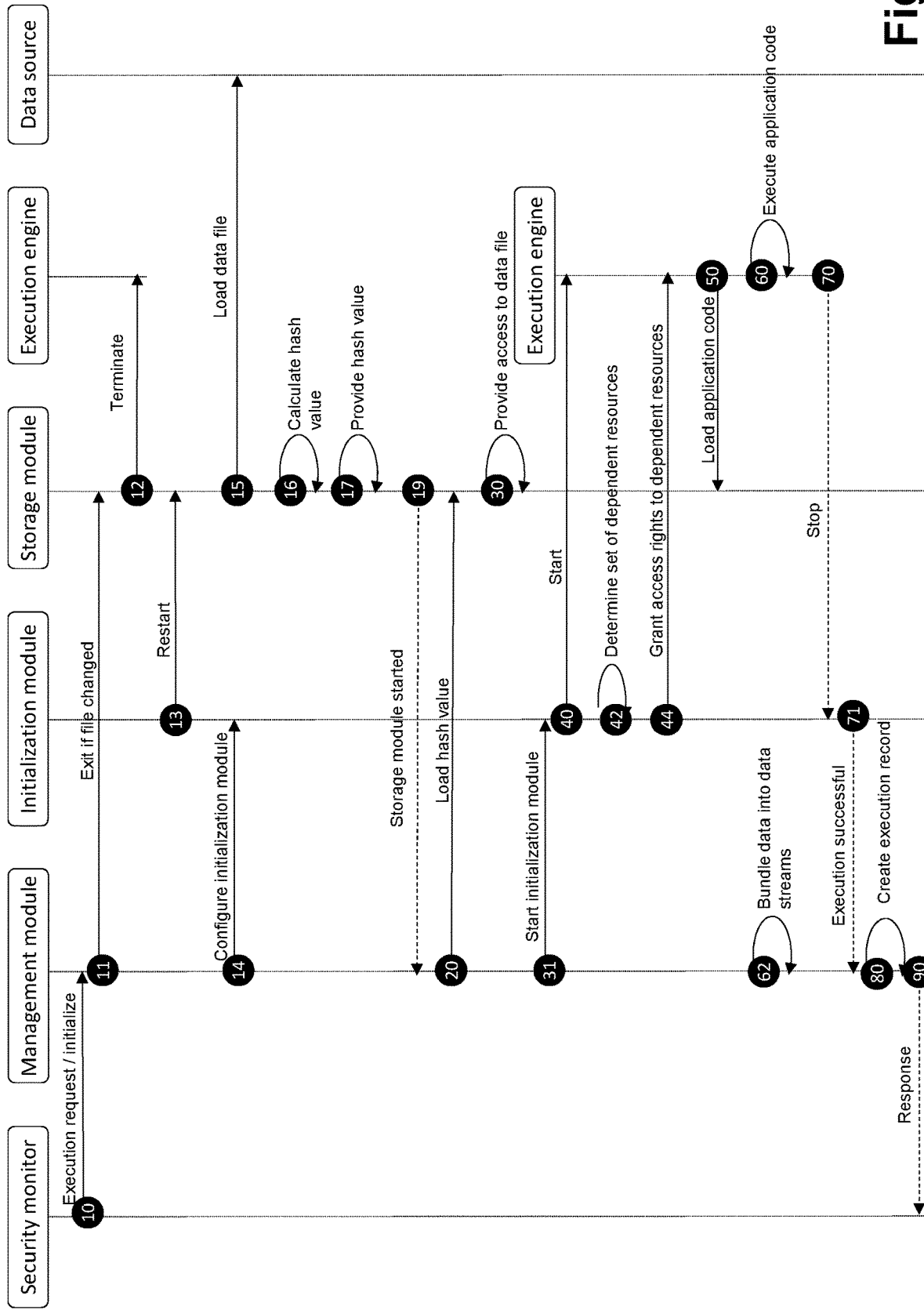
FIG. 9: shows a sequence diagram of a further method of operating a trusted execution environment according to the present disclosure.

FIG. 9 shows a sequence diagram of a method for operating a trusted execution environment 100 comprising storing a data file on a storage module 104 implemented as a load-once hashing ROM according to one of the embodiments disclosed herein. According to the embodiments of the method illustrated in FIG. 9, the data file loaded onto the storage module 104 comprises application code; the data consumer is an execution engine 102 of a trusted execution environment 100; and the hash value consumer is a management module 106 of the trusted execution environment 100.

In step 10, the management module 106 receives execution request(s) from a requestor to execute the application code. Also as part of step 10, the trusted execution environment 100 is initialized, wherein a storage module 104, a management module 106 as well as an execution engine are provided as part of the trusted execution environment 100.

In step 11, the storage module 104 detects any change and/or attempted change of the data file. If the storage module 104 detects that the data file changed and/or there was an attempt to change the data file, in step 12, the storage module 104 terminates all execution engines 102 which have been granted access to the data file. Furthermore, in step 13—the storage module 104 restarts itself upon detection of a change and/or attempted change of the data file. Only after restarting does the storage module 104 allow another data file to be loaded. Restarting the storage module 104 leads to any data file to be permanently erased from the storage module 104.

In step 14, the management module 106 configures the initialization module 105. Thereafter, the initialization module 105 initializes the execution engine 102, based on a configuration by the management module 106.

After the storage module 104 has been initialized—in a step 15—a data file is loaded from a data source into the storage module 104.

After the data file has been loaded into the storage module 104, in step 16, the storage module 104 computes a hash value of the data file. Thereafter, in a step 17, the storage module 104 makes the hash value available to the management module 106 of the trusted execution environment 100. Once the management module 106 determines/is notified—in step 19—that the storage module 104 has been started, the management module 106 loads the hash value from the storage module 104.

In step 30—the storage module 104 grants the execution engine 102 read-only access for accessing the data file.

After the management module 106 has loaded the hash value, the management module 106 starts the initialization engine 105—in step 31. Thereafter, in a step 40, the initialization engine 105 initializes the execution engine 102 and instructs it to load the application code from the storage module 104.

In step 42, the initialization module 105 determines a set of dependent resources of the computing device 1 required by the application code for execution. Thereafter, in step 44, the initialization module 105 grants the execution engine 102 access rights only to said set of dependent resources.

In step 50, the execution engine 102 loads the application code from the storage module 104 as instructed. Then, in step 60, the execution engine 102 executes the application code according to the execution request. In the background, in a step 62, the management module 106 bundles requested data input, response data output to and from the execution engine 102 into input data stream(s) and output data stream(s), respectively.

After execution of the application code, in step 70, the initialization module 105 is notified of the successful termination of the execution engine 102 and—in step 71—notifies the management module 106 that the execution was successful. Thereafter, in step 80, the management module 106 creates the execution record of execution of the application code by the execution engine 102 comprising data indicative of said input data stream(s) and output data stream(s) as well as the hash value. Finally, in step 90, the management module 106 transmits the execution record to the security monitor 112.

Figure 10:
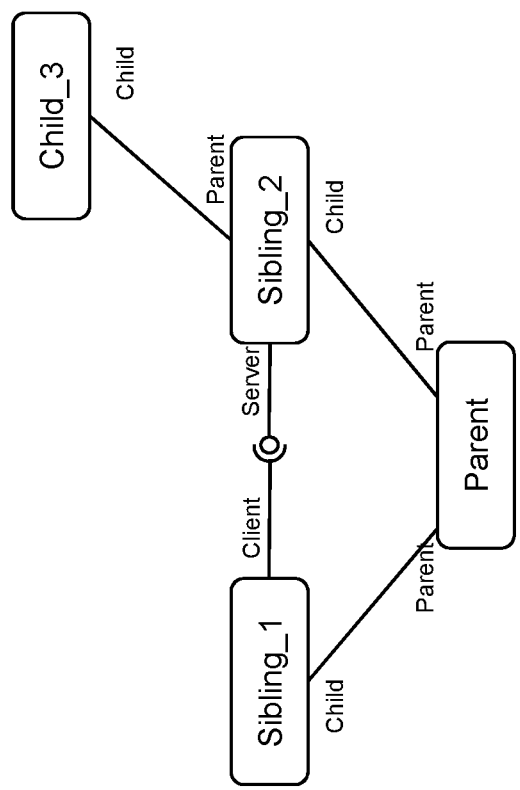
FIG. 10: shows a block diagram of a computing environment comprising a plurality of components and a plurality of dependency relationships between the plurality of components.

FIG. 10 shows a block diagram of a computing environment comprising a plurality of components and a plurality of dependency relationships between the plurality of components. The illustrative example shown on FIG. 10 comprises four components, namely Parent, Sibling_1, Sibling_2 and Child_3. Furthermore, FIG. 10 shows two different types of dependency relationships between the plurality of components, namely:

parent-child dependencies:
- Parent—Sibling_1: Indicative that Parent component is able to spawn child component Sibling_1
- Parent—Sibling_2: Indicative that Parent component is able to spawn and terminate child component Sibling_2
- Sibling_2—Child_3: Indicative that Sibling_2 component is able to spawn child component Child_3 client-server dependency:
- Sibling_2 is a server component that provides a service. Sibling_1 connects to that service, and thus is dependent of Sibling_2 in the client-server relationship.

Figure 11:
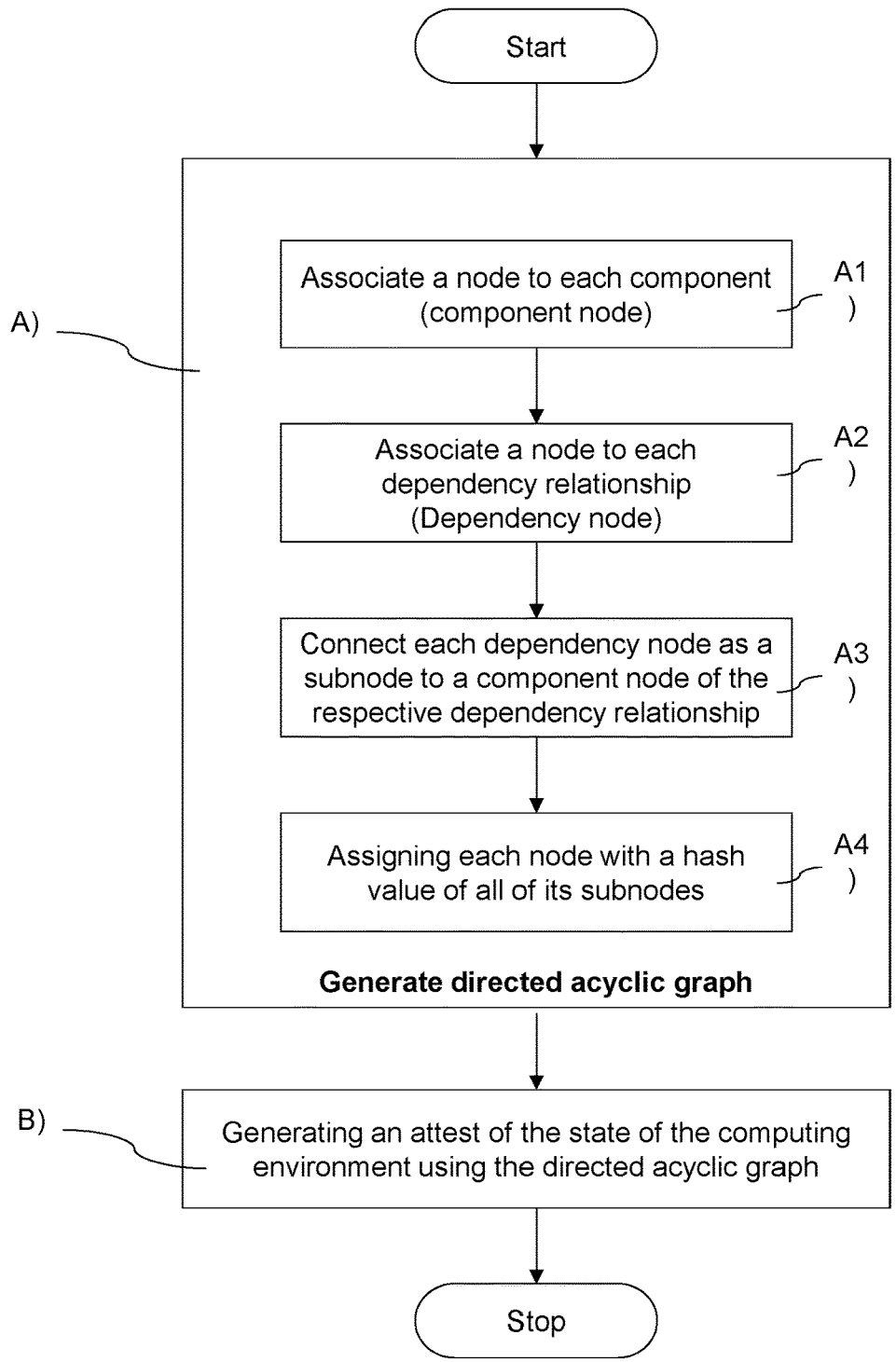
FIG. 11: shows a flowchart illustrating a method of attesting a state of a computing environment, according to the present disclosure.

FIG. 11 shows a flowchart illustrating a method of attesting a state of a computing environment, according to the present disclosure. The method comprises two major steps:

Step A) generating a directed acyclic graph comprising a plurality of nodes and a plurality of directed edges connecting the nodes; and Step B) generating an attest of the state of the computing environment using the directed acyclic graph.

Step A) comprises several substeps. Within substep A1), a node is associated with each component of the computing environment. Since nodes of a graph each have a so-called name or label and a value, the association of a node with a component may be performed by labelling/naming the node with a component ID.

Nodes associated with a component of the computing environment are referred to as component nodes.

Within substep A2), a node is associated with each dependency relationship, such as by labelling/naming the node with a relationship ID. Nodes associated with a dependency relationship are referred to as dependency nodes. Furthermore, each dependency node is assigned with a hash value of data descriptive of said dependency relationship, such as an XML element. Since nodes of a graph each have one or more value fields (in addition to a name/label), the "assignment" of a node with a hash value may be performed by recording the hash value as a value field of the respective node.

The data descriptive of a dependency relationship comprises at least: data identifying each component included in the dependency relationship (such as a component ID, a component reference or the like) and data identifying the dependee and depender components of the dependency relationship.

Within substep A3), each node associated with a dependency relationship (each dependency node) is connected, using a directed edge, to node(s) associated with component(s) (component node) included in the respective dependency relationship (either as depender or dependee). As used in the context of the present application, a 'subnode' refers to a node A of a graph that is connected to another node B using a directed edge, the edge being directed from node B towards node A.

According to a particular aspect of the present disclosure, such as the one illustrated on the figures, the directed edges, connecting nodes associated with parent-child dependencies to nodes associated with components included in the respective dependency relationship:
  are directed from a component node associated with the dependee towards the dependency node associated with the respective dependency relationship;
  are directed from a dependency node associated with the respective dependency relationship towards a component node associated with the depender.

On the other hand, the directed edges, connecting nodes associated with other types of dependencies (not parent-child dependencies) to nodes associated with components included in the respective dependency relationship are only directed from a node associated with the dependee of the respective dependency relationship towards the node associated with the respective dependency relationship. According to particular aspects, in order to ensure that the graph is acyclic, for dependency types other than parent-child dependencies, there is no edge connecting the depender.

Within step A4), each node is assigned with a hash value of all of its subnodes. In particular, each node is assigned with a hash value of the concatenation of the hash values of all subnodes, wherein the hash of a node comprises a hash value of its name/label and data fields.

s Within Step B), an attest of the state of the computing environment is generated using the directed acyclic graph. An attest of the state of the computing environment comprises any suitable representation of the directed acyclic graph generated in step A), such as—but not limited to—Edge lists, Adjacency matrices and/or Adjacency lists.

Figure 12:
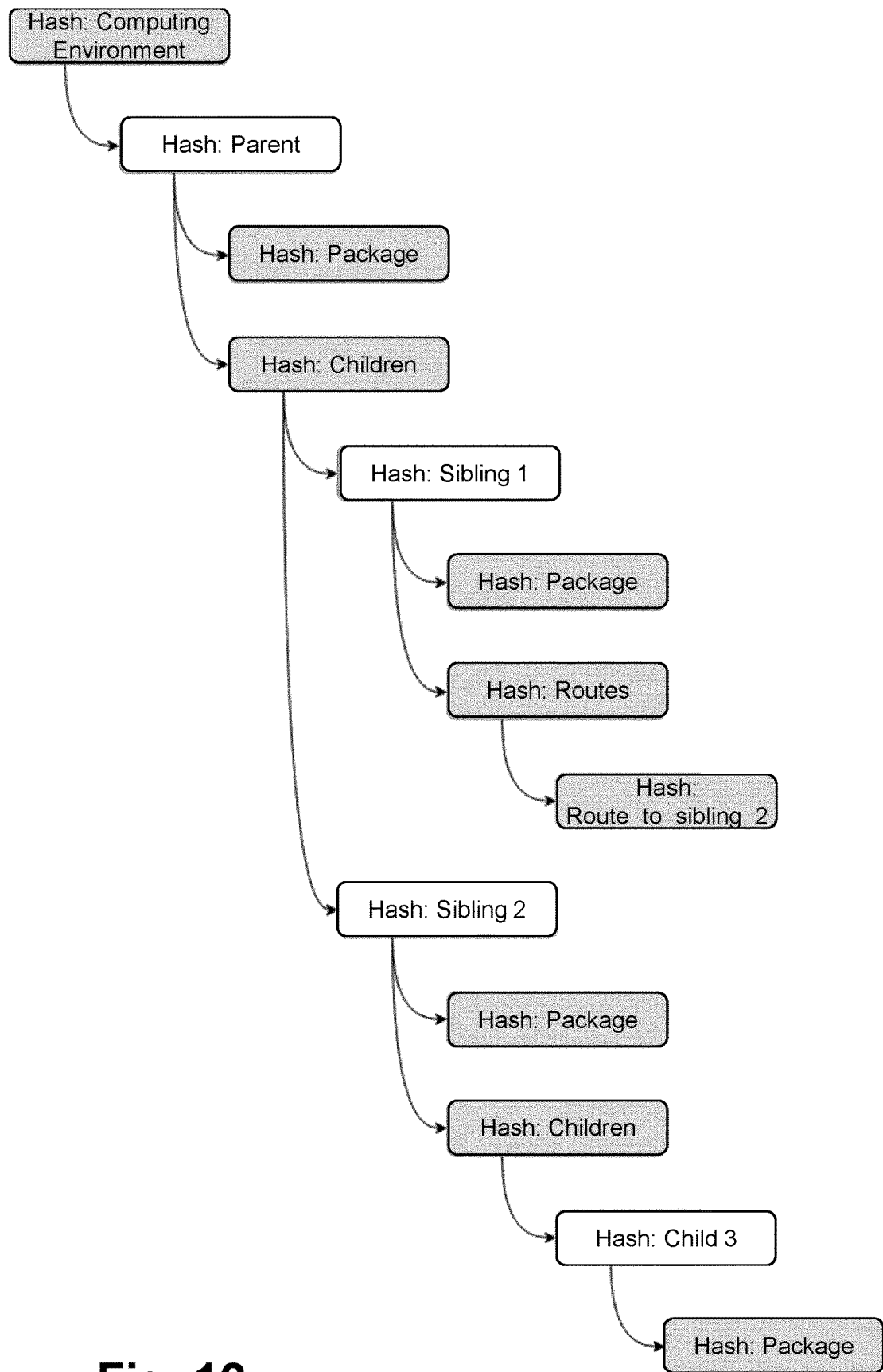
FIG. 12: shows a directed acyclic graph used for attesting a state of a computing environment, according to the present disclosure.

FIG. 12 shows the directed acyclic graph corresponding to the computing environment depicted on FIG. 10, as generated according to the present disclosure. As shown in this figure, each component of the computing environment, namely Parent, Sibling_1, Sibling_2 and Child_3 is associated with a node of the graph, in particular a component node (shown with a solid white rounded rectangle).

Each dependency relationship is associated with a dependency node (shown with a solid grey rounded rectangle), namely:
  Software package/binary/library dependencies between each component and its underlying sw package (e.g. executable binaries), labeled "Hash: Package".
  Parent-child dependencies:
    A dependency node labeled "Hash: Children", connected as a subnode to the node "Hash: Parent". The dependency node labeled "Hash: Children" comprises a hash value of data descriptive of all children of the component "Parent" and a hash value of all of its subnodes, namely the hash values of Sibling_1 and Sibling_2.
    A dependency node labeled "Hash: Children", connected as a subnode to the node "Hash: Sibling_2". The dependency node labeled "Hash: Children" comprises a hash value of data descriptive of all children of the component "Sibling_2" and a hash value of all of its subnodes, namely the hash value of Child_3.
  Client-server dependency:
    Since it is the client that is aware of what services of which servers it consumes (and not the other way around), the node associated with the client-server dependency is connected with a directed edge to the node associated with the server component, labeled "Hash: Route_to_sibling_2".

Below is a section of an XML file representative of the directed acyclic graph of FIG. 12 and corresponding to the computing environment of FIG. 10:

```
<component name="Computing environment"
    hash="080eaea6de3eff62b86631b31f75d2fd">
  <component name="Parent"
      hash="180eaea6de3eff62b86631b31f75d2fd">
    <package name="Parent_1.05.pkg"
        hash="280eaea6de3eff62b86631b31f75d2fd">
      <binary name="parent_1.05.bin"
          hash="380eaea6de3eff62b86631b31f75d2fd">
      </binary>
      <library name="stdlib.so"
          hash="480eaea6de3eff62b86631b31f75d2fd">
      </library>
    </package>
    <children name="children"
        hash="580eaea6de3eff62b86631b31f75d2fd">
      <component name="Sibling_1"
          hash="680eaea6de3eff62b86631b31f75d2fd">
        <package name="Sibling_v1.2.pkg"
            hash="780eaea6de3eff62b86631b31f75d2fd">
        </package>
        <routes name="routes"
            hash="880eaea6de3eff62b86631b31f75d2fd">
          <service name="NIC"
              hash="980eaea6de3eff62b86631b31f75d2fd">
            Sibling_2
          </service>
        </routes>
      </component>
      <component name="Sibling_2"
          hash="a80eaea6de3eff62b86631b31f75d2fd">
        <package name="Sibling_v2.2.pkg"
            hash="b80eaea6de3eff62b86631b31f75d2fd">
        </package>
        <children name="children"
            hash="c80eaea6de3eff62b86631b31f75d2fd">
          <component name="Child_3"
              hash="d80eaea6de3eff62b86631b31f75d2fd">
            <package name="Child_v1.0.pkg"
                hash="e80eaea6de3eff62b86631b31f75d2fd">
            </package>
          </component>
```

```
            </children>
          </component>
        </children>
      </component>
    </component>
```

Figure 13:
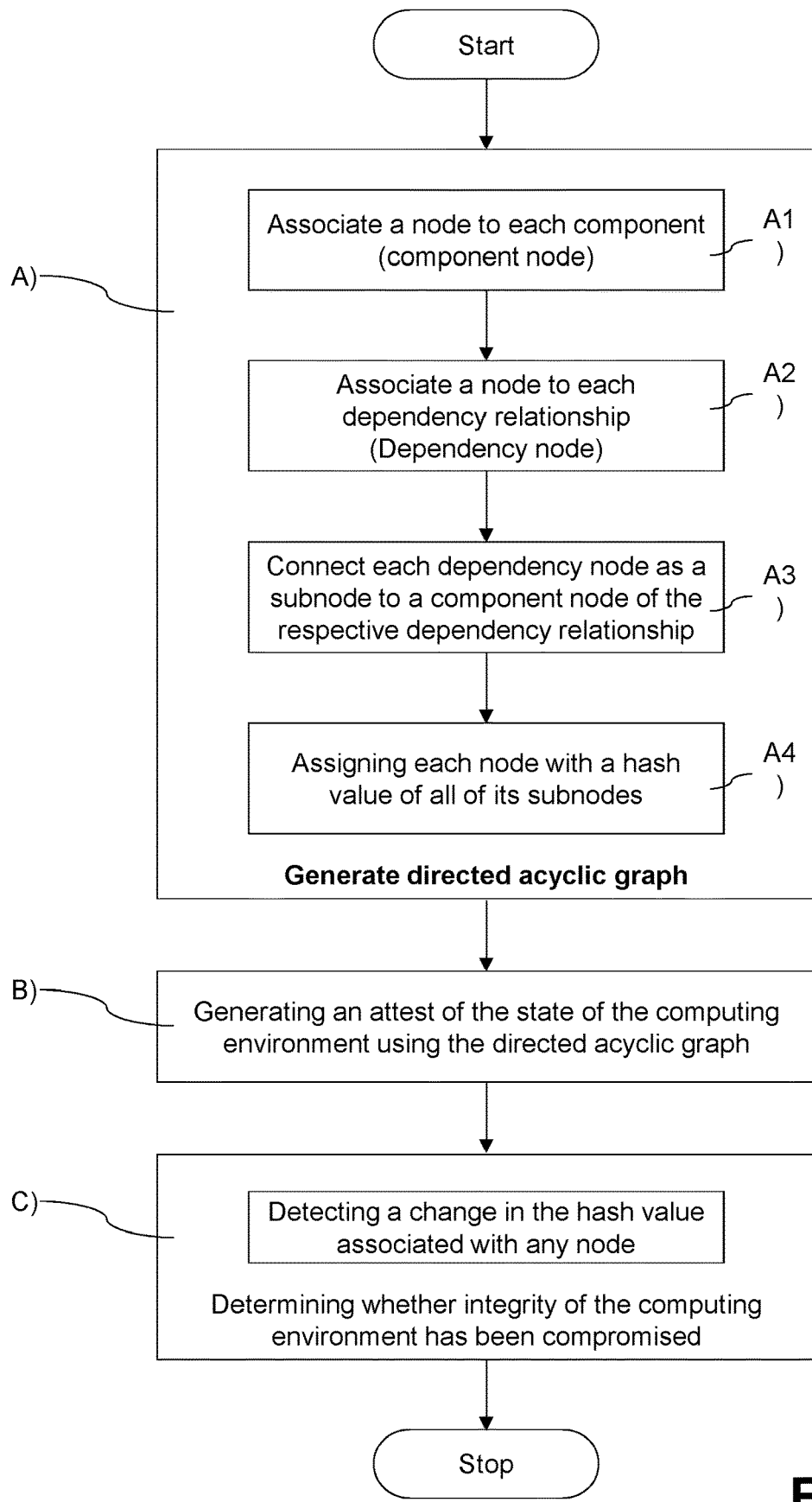
FIG. 13: shows a flowchart illustrating a method of attesting a state of a computing environment as well as determining whether integrity of the computing environment has been compromised, according to the present disclosure.

FIG. 13 shows a flowchart illustrating a method of attesting a state of a computing environment as well as determining—in a step C) whether integrity of the computing environment has been compromised by detecting a change in the hash value(s) associated with any node of the directed acyclic graph. Since all components and all dependency relationships are captured by the graph, detecting a change in the hash value(s) associated with any node provides a robust method of determining a change of the computing environment as a whole.

Figure 14:
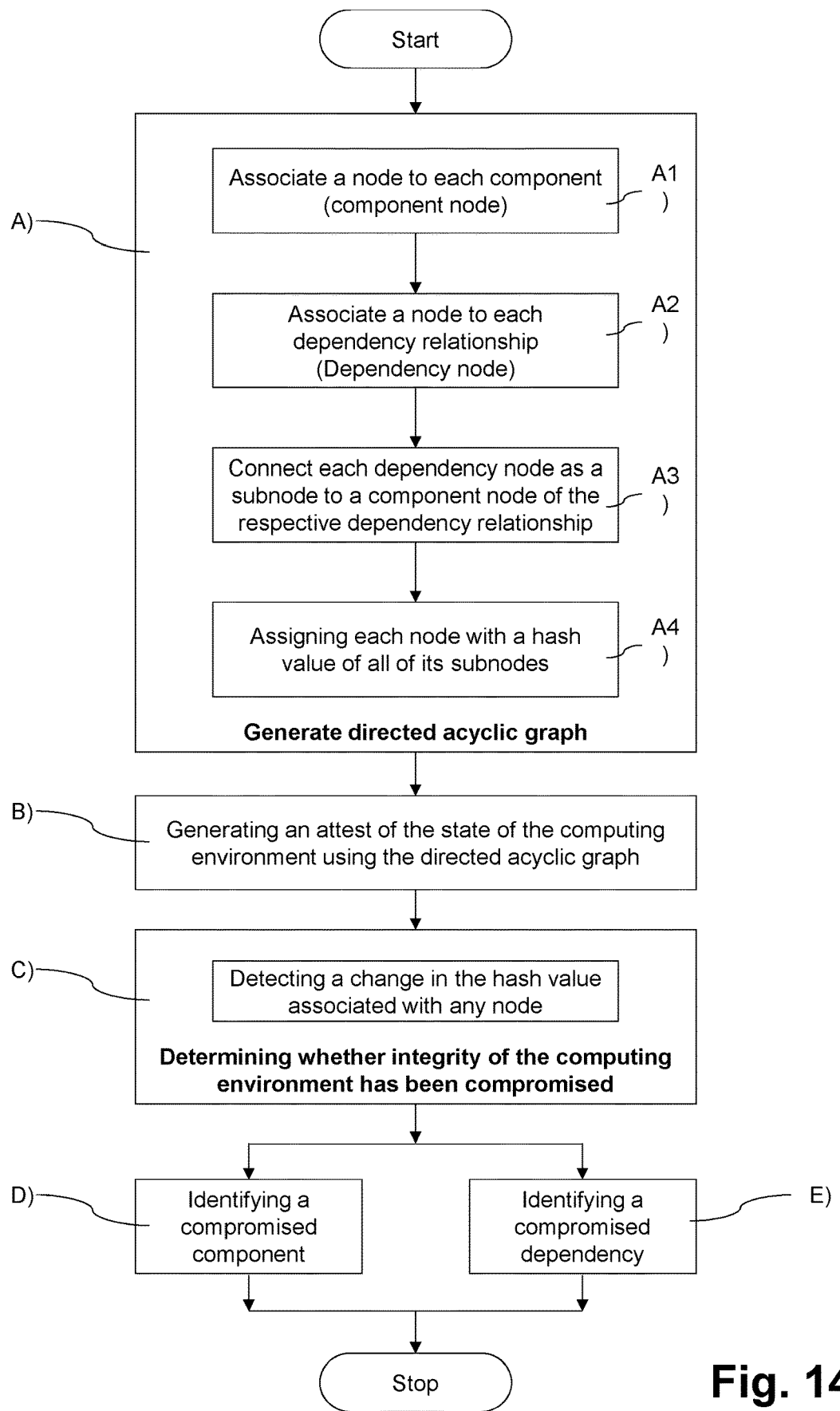
FIG. 14: shows a flowchart illustrating a method of attesting a state of a computing environment, determining whether integrity of the computing environment has been compromised as well as identifying a compromised component and/or dependency, according to the present disclosure.

FIG. 14 shows a flowchart illustrating a method of attesting a state of a computing environment. As shown on this figure, in addition to determining whether integrity of the computing environment has been compromised, compromised component(s) and dependency(s) are identified in steps D) and E), respectively. Within step D), a compromised component is identified by finding the node, assigned to said component, with a changed hash value. Within step E), a compromised dependency relationship is identified by finding the node, assigned to said dependency relationship, with a changed ash value.

Figure 15:
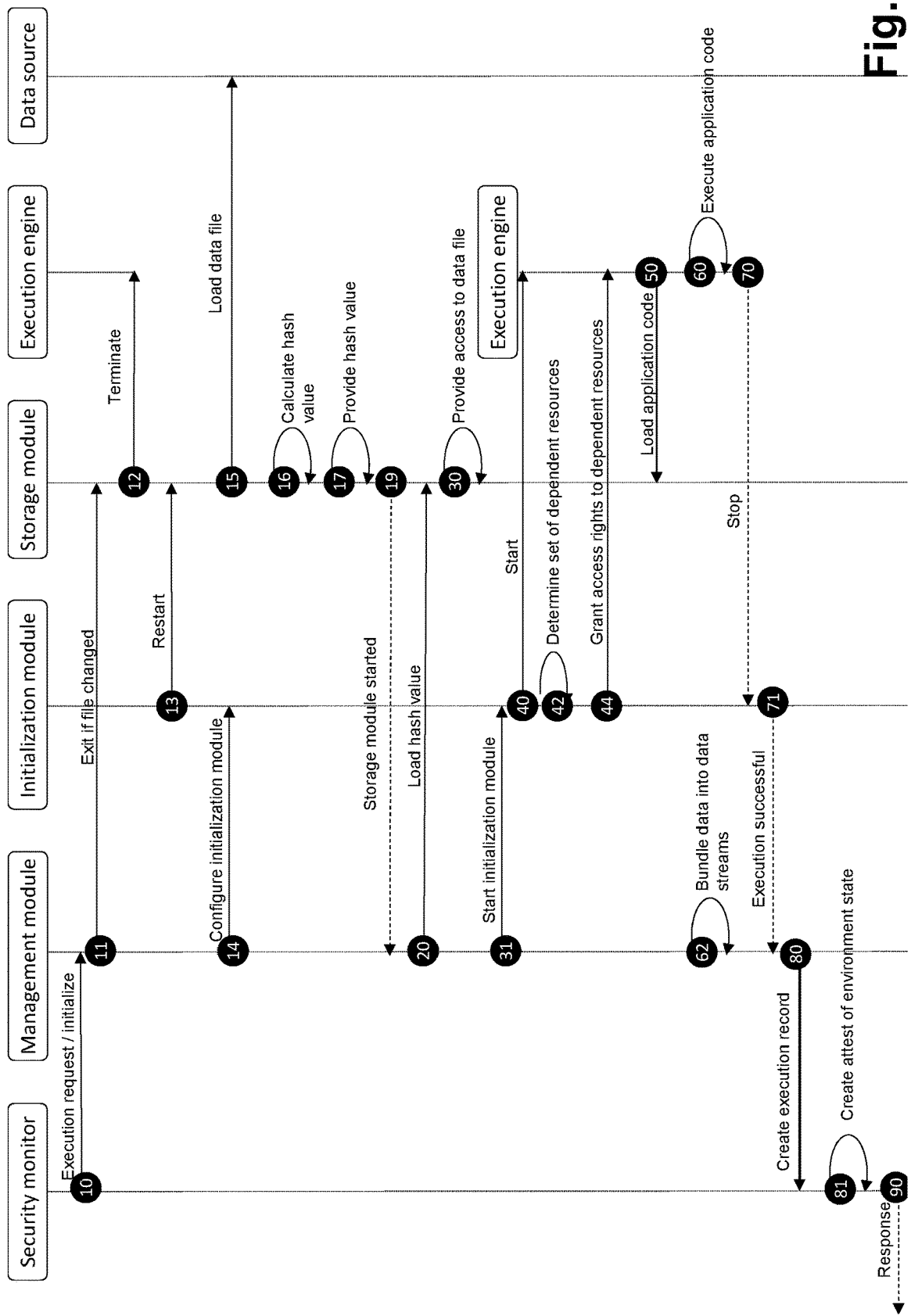
FIG. 15: shows a sequence diagram of a further method of operating a trusted execution environment according to the present invention.

FIG. 15 shows a sequence diagram of a further method of operating a trusted execution environment according to the present invention. In addition to the steps as described in relation with FIG. 9, the method as illustrated on FIG. 15 further comprises step 81, wherein the security monitor 112 captures and attests the state of the trusted execution environment 100, in particular using a directed acyclic graph according to any of the herein described embodiments of the method of attesting a state of a computing environment.

It should be noted that, in the description, the computer program code has been associated with specific processors and the sequence of the steps has been presented in a specific order, one skilled in the art will understand, however, that the computer program code may be structured differently and that the order of at least some of the steps could be altered, without deviating from the scope of the invention.

Further disclosed and proposed are:

A data processing apparatus/device/network/system comprising means for carrying out one or more method steps according to embodiments of a method disclosed herein.

A data processing apparatus/device/network/system comprising a processor for carrying out one or more method steps according to embodiments of a method disclosed herein.

A computer program product comprising computer-executable instructions which, when executed by a data processing apparatus/device/network/system, cause the data processing apparatus/device/network/system to carry out one or more method steps according to embodiments of a method disclosed herein.

Computer-readable media, comprising volatile and/or non-volatile storage media (such as a data carrier) and/or transmission media (such as a data carrier signal), comprising computer-executable instructions which, when executed by a data processing apparatus/device/network/system, cause the data processing apparatus/device/network/system to carry out one or more method steps according to embodiments of a method disclosed herein.

A computer readable data structure comprising computer-executable instructions which, when executed by a data processing apparatus/device/network/system, cause the data processing apparatus/device/network/system to carry out one or more method steps according to embodiments of a method disclosed herein.

Disclosed herein is a 1. aspect of a computing device 1 comprising one or more processors 2 and one or more memory devices 3 having stored thereon computer readable instructions which, when executed by the one or more processors 2, cause the computing device 1 to establish a storage module 104 for storing a data file, the storage module 104 being configured to:

load a data file from a data source into the storage module 104;

compute a hash value of the data file loaded into the storage module 104 and make said hash value available to a hash value consumer;

grant read-only access to data consumer(s) for accessing said data file loaded into the storage module 104;

detect any change and/or attempted change of the data file and terminate all data consumers which have been granted access to the data file.

Further disclosed herein is a 2. aspect of a computing device according to the 1. aspect, wherein the storage module 104 is configured to prevent any further loading of a data file, the storage module 104 being restarted before a data file can be loaded again, wherein restarting the storage module 104 causes any data file to be permanently erased from the storage module 104.

Further disclosed herein is a 3. aspect of the computing device 1 according to the 1 or 2 aspect(s), wherein the storage module 104 is configured to detect any attempted change of the data file by identifying any Read into Memory instructions received by the storage module 104.

Further disclosed herein is a 4. aspect of the computing device 1 according to one of the preceding aspects, wherein:

loading a data file from a data source into the storage module 104 comprises loading in the storage module 104 a reference to the data file as stored at the data store; and the storage module 104 is configured to detect any change of the data file by computing a hash value of the data file as stored at the data store and comparing it with the hash value of the data file loaded into the storage module 104.

Further disclosed herein is a 5. aspect of the computing device 1 according to one of the preceding aspects, wherein the storage module 104 is further configured to grant read-only access to the data consumer(s) for accessing said data file only after the hash value consumer has accessed the hash value.

Further disclosed herein is a 6. aspect of the computing device 1 according to one of the preceding aspects, wherein the storage module 104 is further configured to establish a server-client relationship with the data consumer(s) which have been granted access to the data file, the storage module 104 being the server and the data consumer(s) being client(s), wherein terminating a server automatically terminates each of its clients.

Further disclosed herein is a 7. aspect of the computing device 1 according to one of the preceding aspects, wherein:
- the data file comprises application code;
- the data consumer is an execution engine 102 of a trusted execution environment 100; and
- the hash value consumer is a management module 106 of the trusted execution environment 100.

Further disclosed herein is a 1. aspect computer implemented method for storing a data file on a storage module 104 of a computing device 1, comprising:
- loading a data file from a data source into the storage module 104;
- computing a hash value of the data file loaded into the storage module 104;
- making said hash value available to a hash value consumer;
- granting read-only access to data consumer(s) for accessing said data file loaded into the storage module 104;
- detecting any change and/or attempted change of the data file and terminate all data consumers which have been granted access to the data file.

Further disclosed herein is a 2. aspect of the computer implemented method for storing a data file, further comprising:
- preventing the storage module 104 from any further loading of a data file;
- restarting the storage module 104 before a data file can be loaded again, wherein restarting the storage module 104 comprises any data file to be permanently erased from the storage module 104.

Further disclosed herein is a 3. aspect of the method according to aspect 1 or 2, further comprising identifying any Read into Memory instructions received by the storage module 104 in order to detect any attempted change of the data file.

Further disclosed herein is a 4. aspect of the method according to one of the aspects 1 to 3, further comprising:
- computing a hash value of the data file as stored at the data store; and
- comparing the hash value of the data file as stored at the data store with the hash value of the data file loaded into the storage module 104 in order to detect any change of the data file.

Further disclosed herein is a 5. aspect of the method according to one of the aspects 1 to 4, wherein read-only access is granted to the data consumer(s) for accessing said data file only after the hash value consumer has accessed the hash value.

Further disclosed herein is a 6. aspect of the method according to one of the aspects 1 to 5, further comprising:
- establishing a server-client relationship with the data consumer(s) which have been granted access to the data file, the storage module 104 being the server and the data consumer(s) being client(s),
- terminating each client upon termination of the server.

Further disclosed herein is a 7. aspect of the method according to one of the aspects 1 to 6, wherein:
- the data file comprises application code;
- the data consumer is an execution engine 102 of a trusted execution environment 100; and
- the hash value consumer is a management module 106 of the trusted execution environment 100.

Further disclosed herein is a computer program product comprising computer-executable instructions which, when executed by one or more processors 2 of a computing device 1 causes the computing device 1 to carry out the method according to one of the aspects 1 to 7.

Further disclosed herein is a 1. aspect of a computer implemented method of attesting a state of a computing environment comprising a plurality of components and a plurality of dependency relationships between the plurality of components, the method comprising:
- A) generating a directed acyclic graph comprising a plurality of nodes and a plurality of directed edges connecting the nodes, comprising;
  - A1) associating a node with each component of the computing environment;
  - A2) associating a node with each dependency relationship and assigning the node with a hash value of data descriptive of said dependency relationship;
  - A3) connecting, using directed edges, each node associated with a dependency relationship to a node(s) associated with a component(s) included in the respective dependency relationship;
  - A4) assigning each node with a hash value of all of its subnodes;
- B) generating an attest of the state of the computing environment using the directed acyclic graph.

Further disclosed herein is a 2. aspect of the method according to aspect 1, wherein data descriptive of a dependency relationship comprises at least:
- data identifying each component included in the dependency relationship; and
- data identifying the dependee and depender components of the dependency relationship.

Further disclosed herein is a 3. aspect of the method according to aspect 2, wherein, the directed edges, connecting node(s) associated with a dependency relationship to node(s) associated with component(s) included in the respective dependency relationship:
- are directed from a node associated with the dependee of the respective dependency relationship towards the node associated with the respective dependency relationship; and/or
- are directed from a node associated with the respective dependency relationship towards a node associated with the depender of the respective dependency relationship.

Further disclosed herein is a 4. aspect of the method according to aspect 2 or 3, wherein said set of dependency relationships comprise one or more dependency relationship types:
- parent-child dependency(s), wherein a parent-child dependency(s) is indicative of a child component being spawned by a parent component, the child component being the depender and the parent component being the dependee; and/or
- client-server dependency(s), wherein a client-server dependency is indicative that a client component consumes a service(s) provided by a server component, the client component being the depender and the server component being the dependee and wherein the data descriptive of the client-server dependency(s) further comprises data identifying the service(s) of the server component consumed by the client component; and/or
- software package/binary/library dependency(s), wherein a software package/binary/library dependency is indicative that, when executing, a component executes computer-readable instructions comprised by a software package and/or library.

Further disclosed herein is a 5. aspect of the method according to one of the preceding aspects, further comprising:

C) determining whether integrity of the computing environment has been compromised by detecting a change in the hash value(s) associated with any node of the directed acyclic graph.

Further disclosed herein is a 6. aspect of the method according to aspect 5, further comprising the step(s) of:
D) identifying a compromised component by finding the node, assigned to said component, with a changed hash value; and/or
E) identifying a compromised dependency relationship by finding the node, assigned to said dependency relationship, with a changed hash value.

Further disclosed herein is a 7. aspect of the method according to one of the preceding aspects, wherein the nodes of the directed acyclic graph are further associated with a hash value of:
binary(s) used to execute the respective component; and/or
dynamic library(s) used to execute the respective component; and/or
source code of the respective component; and/or
source code of the software library(s); and/or
raw data file(s); and/or
a compiler(s) that has been used to compile said source code of the respective component into computer-readable instructions executed within the respective component.

Further disclosed herein is an 8. aspect of the method according to one of the preceding aspects, wherein one or more nodes of the directed acyclic graph is further associated with version information for each component and wherein the method further comprises:
cross-referencing said version information with a database of vulnerable versions of components and
terminating the computing environment running any component whose version information is flagged as unsecure in said database.

Further disclosed herein is a 9. aspect of the method according to aspect 8, further comprising the step of notifying a Security Information and Event Management System (SIEM) about a vulnerability of the computing environment if any component is associated with version information listed in said database of vulnerable versions of components.

Further disclosed herein is a 10. aspect of the method according to one of the preceding aspects, wherein the nodes of the directed acyclic graph are further associated with licensing information for each component and wherein the method further comprises the step of attesting compliancy of the computing environment with a specified licensing requirement by verifying that all nodes associated with a component satisfy said licensing requirement.

Further disclosed herein is an 11. aspect of the method according to one of the preceding aspects, wherein each node is associated with a hash value of the concatenation of the hash values of all subnodes.

Further disclosed herein is a 12. aspect of the method according to one of the preceding aspects, wherein said computing environment is a trusted execution environment 100 comprising an execution engine 102 executing said plurality of components; a management module 106 configured to control a life cycle(s) of the execution engine 102; and a storage module 104 for application code to be executed by component(s) of the execution engine 102

Further disclosed herein is a 13. aspect of the method according to aspect 12, wherein components executed by the execution engine 102 comprise:

execution of application code provided for execution to the trusted execution environment 100 by a requestor; and/or
components started during execution of said application code according to one or more of said parent-child relationship(s); and/or
services started by the execution engine 102 according to one or more of said client-server dependency(s); and/or
executable binaries of libraries loaded by the execution engine 102 according to one or more of said software package/binary/library dependency(s).

Further disclosed herein is a computing device 1 comprising one or more processors 2 and one or more memory devices 3 having stored thereon computer readable instructions which, when executed by the one or more processors 2, cause the computing device 1 to carry out the method according to one of the aspects 1 to 13.

Further disclosed herein is a computer program product comprising computer-executable instructions which, when executed by a processor 2 of a computing device 1 causes the computing device 1 to carry out the method according to one of the aspects 1 to 13.

LIST OF REFERENCE NUMERALS computing device 1
processor 2
memory device 3
trusted execution environment 100
execution engine 102
storage module 104
initialization module 105
management module 106
security monitor 112
platform server 114
trusted execution platform 200

What is claimed is:

1. A computing device comprising one or more processors and one or more memory devices having stored thereon computer readable instructions which, when executed by the one or more processors, cause the computing device to establish a trusted execution environment for executing application code, the trusted execution environment comprising:
an execution engine configured to execute application code;
a storage module configured to load the application code and to provide read-only access to the execution engine for accessing the application code; and
a management module configured to:
receive, from a requestor, execution request(s) to execute the application code;
instruct the execution engine to load the application code from the storage module and to execute the application code according to the execution request;
bundle data input, response data output to and from the execution engine into input data stream(s) and output data stream(s), respectively;
actively terminate the execution engine immediately after execution of the application code;
create an execution record of execution of the application code by the execution engine comprising data indicative of said input data stream(s) and output data stream(s); and
transmit the execution record to the requestor.

2. The computing device according to claim 1, wherein the trusted execution environment further comprises an initialization module created by the management module, the initialization module being configured to initialize the execution engine by:

starting the execution engine in accordance with a configuration received from the management module;

determining a set of dependent resources of the computing device required by the application code for execution;

granting the execution engine access rights only to said set of dependent resources; and instructing the execution engine to load the application code from the storage module and to execute the application code.

3. The computing device according to claim 2, wherein granting the execution engine access rights only to dependent resources of the computing device required by the application code for execution comprises:

determining a set of capabilities required by the execution engine;

requesting access token(s) corresponding to said set of capabilities from resources possessing said capabilities; and granting access rights for the execution engine to resources of the computing device according said access token(s).

4. The computing device according to claim 3, wherein the management module is further configured to:

include execution status data from the execution engine via the initialization module into the execution record; and terminate the instance of the execution engine if the execution status data comprises data warranting termination.

5. The computing device according to claim 1, wherein: the storage module is further configured to compute a hash value of the application code and provide said hash value to the management module; and the management module is further configured to include said hash value into the execution record.

6. The computing device according to claim 1, wherein the computer readable instructions, when executed by the one or more processors, further cause the computing device to establish a security monitor, the security monitor being configured to:

receive a plurality of execution requests from a platform server, the execution requests each comprising authentication data and application code to be executed; authenticate execution requests by verifying said authentication data of the execution requests;

upon successful authentication of the execution requests:

initialize a plurality of instances of the trusted execution environment corresponding to said plurality execution requests;

forwarding each execution request to the management module of the respective instance of the trusted execution environment; forwarding each application code to the storage module of the respective instance of the trusted execution environment; receiving execution records corresponding to the execution of the application codes from the management modules of the respective instances of the trusted execution environment; and forwarding the execution records to the platform server.

7. The computing device according to claim 6, wherein the security monitor is further configured to dynamically allocate and manage resources of the computing device, in particular resources of the one or more processors, to the plurality of instances of the trusted execution environment.

8. The computing device according to claim 6, wherein the security monitor is configured to:

to digitally sign the execution record with an attestation key; and/or capture and attest data indicative of a platform state, in particular a directed acyclic graph, related to the execution of the application code by the trusted execution environment.

9. A computer implemented method of operating a trusted execution environment, the method comprising:

initializing an execution engine as part of the trusted execution environment and configuring said execution engine for executing application code;

providing a storage module as part of the trusted execution environment, the storage module being configured to load the application code and to provide read-only access to the execution engine for accessing the application code;

providing a management module as part of the trusted execution environment;

the management module receiving execution request(s) from a requestor to execute the application code;

the management module instructing the execution engine to load the application code from the storage module and to execute the application code according to the execution request;

the management module bundling requested data input, response data output to and from the execution engine into input data stream(s) and output data stream(s), respectively;

the management module actively terminating the execution engine immediately after execution of the application code;

the management module creating an execution record of execution of the application code by the execution engine comprising data indicative of said input data stream(s) and output data stream(s); and the management module transmitting the execution record to the requestor.

10. The method according to claim 9 further comprising:

the management module configuring an initialization module: the initialization module starting the execution engine in accordance with a configuration received from the management module;

the initialization module determining a set of dependent resources of the computing device required by the application code for execution;

the initialization module granting the execution engine access rights only to said set of dependent resources; and the initialization module instructing the execution engine to load the application code from the storage module and to execute the application code.

11. The method according to claim 10, wherein granting the execution engine access rights only to dependent resources of the computing device required by the application code for execution comprises:

determining a set of capabilities required by the execution engine;

requesting access token(s) corresponding to said set of capabilities from resources possessing said capabilities; and granting access rights for the execution engine to resources of the computing device according said access token(s).

12. The method according to claim 9, further comprising:
including, by the management module, execution status data from the execution engine via the initialization module into the execution report; and
terminating the instance of the execution engine, by the management module, if the execution status data comprises status data warranting termination.

13. The method according to claim 9, further comprising:
the storage module computing a hash value of the application code and provide said hash value to the management module; and
the management module including said hash value into the execution record.

14. The method according to claim 9, further comprising:
establishing a security monitor as part of the trusted execution environment;
the security monitor receiving a plurality of execution requests from a platform server, the execution requests each comprising authentication data and application code to be executed;
the security monitor authenticating execution requests by verifying said authentication data of the execution requests; and
the security monitor, upon successful authentication of the execution requests:
  initialize a plurality of instances of the trusted execution environment corresponding to said plurality execution requests;
  forwarding each execution request to the management module of the respective instance of the trusted execution environment; forwarding each application code to the storage module of the respective instance of the trusted execution environment; receiving execution records corresponding to the execution of the application codes from the management modules of the respective instances of the trusted execution environment; and
  forwarding the execution records to the platform server.

15. The method according to claim 14, further comprising dynamically allocating and managing resources of the computing device, in particular resources of the one or more processors, to the plurality of instances of the trusted execution environment.

16. The method according to claim 9, further comprising digitally signing the execution record with an attestation key; and/or
capturing and attesting data indicative of a platform state, in particular comprising a DAG, related to the execution of the application code by the trusted execution environment.

17. A computer program product comprising one or more memory devices having stored thereon computer-executable instructions which, when executed by one or more processors of a computing device causes the computing device to perform a method comprising:
initializing an execution engine as part of the trusted execution environment and configuring said execution engine for executing application code;
providing a storage module as part of the trusted execution environment, the storage module being configured to load the application code and to provide read-only access to the execution engine for accessing the application code;
providing a management module as part of the trusted execution environment;
receiving, by the management module, execution request(s) from a requestor to execute the application code;
instructing, by the management module, the execution engine to load the application code from the storage module and to execute the application code according to the execution request;
bundling, by the management module, requested data input, response data output to and from the execution engine into input data stream(s) and output data stream(s), respectively;
actively terminating, by the management module, the execution engine immediately after execution of the application code;
creating, by the management module, an execution record of execution of the application code by the execution engine comprising data indicative of said input data stream(s) and output data stream(s); and
transmitting, by the management module, the execution record to the requestor.

* * * * *